(12) United States Patent
Bauer

(10) Patent No.: US 9,132,571 B2
(45) Date of Patent: Sep. 15, 2015

(54) ROTARY DRILL

(75) Inventor: Kim Bauer, Stenlose (DK)

(73) Assignee: BAUER DRILL I/S, Havdrup (DK)

( * ) Notice: Subject to any disclaimer, the term of this patent is extended or adjusted under 35 U.S.C. 154(b) by 436 days.

(21) Appl. No.: 13/513,322

(22) PCT Filed: Nov. 24, 2010

(86) PCT No.: PCT/DK2010/000154
§ 371 (c)(1),
(2), (4) Date: Sep. 10, 2012

(87) PCT Pub. No.: WO2011/066831
PCT Pub. Date: Jun. 9, 2011

(65) Prior Publication Data
US 2013/0025942 A1 Jan. 31, 2013

Related U.S. Application Data

(60) Provisional application No. 61/326,382, filed on Apr. 21, 2010.

(30) Foreign Application Priority Data

Dec. 3, 2009 (DK) .................................. 2009 70242

(51) Int. Cl.
*E21B 10/44* (2006.01)
*B28D 1/14* (2006.01)
*B23B 51/02* (2006.01)

(52) U.S. Cl.
CPC ................ *B28D 1/146* (2013.01); *B23B 51/02* (2013.01); *E21B 10/44* (2013.01); *B23B 2226/75* (2013.01); *B23B 2251/18* (2013.01); *B23B 2251/46* (2013.01)

(58) Field of Classification Search
USPC .......................... 175/394, 420.1, 435; 408/230
See application file for complete search history.

(56) References Cited

U.S. PATENT DOCUMENTS

| 2,673,714 | A | * | 3/1954 | Hargrave ...................... 175/394 |
| 4,373,839 | A | | 2/1983 | Negishi et al. |
| 4,503,920 | A | * | 3/1985 | Clement ...................... 175/394 |
| 4,565,471 | A | | 1/1986 | Negishi et al. |
| 4,671,710 | A | | 6/1987 | Araki |
| 4,687,388 | A | | 8/1987 | Yokota et al. |

FOREIGN PATENT DOCUMENTS

| DE | 2152127 A1 | 4/1973 |
| DE | 102 08 820 A1 | 9/2003 |
| EP | 0 798 065 A2 | 10/1997 |
| GB | 280416 | 11/1927 |
| GB | 832238 | 4/1960 |
| JP | 61-168415 A | 7/1986 |

* cited by examiner

*Primary Examiner* — William P Neuder
(74) *Attorney, Agent, or Firm* — Jacobson Holman, PLLC.

(57) ABSTRACT

In a rotary drill, the drill is provided with at least one groove, which has a center lying on the axis of rotation of the drill. The two end points of the groove define a groove width, and the drill is provided with two or more cutting edges. Two cutting angles are defined. The groove has a left side and a right side. The rotary drill can be used in a rotary drilling machine. The drill can be provided with a drill bit.

58 Claims, 22 Drawing Sheets

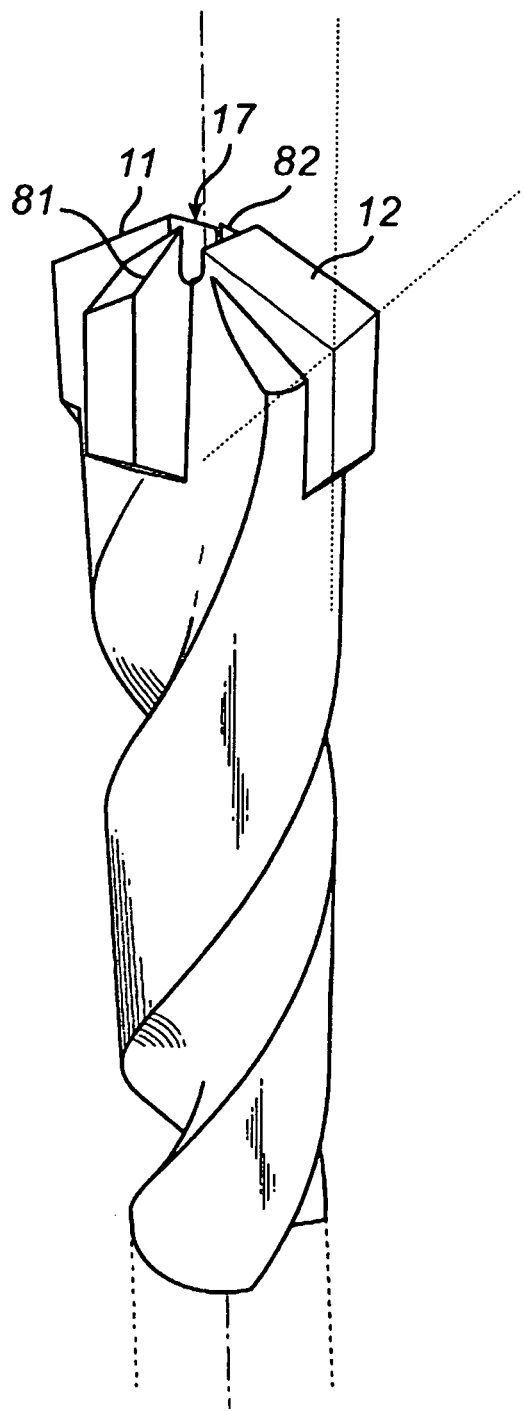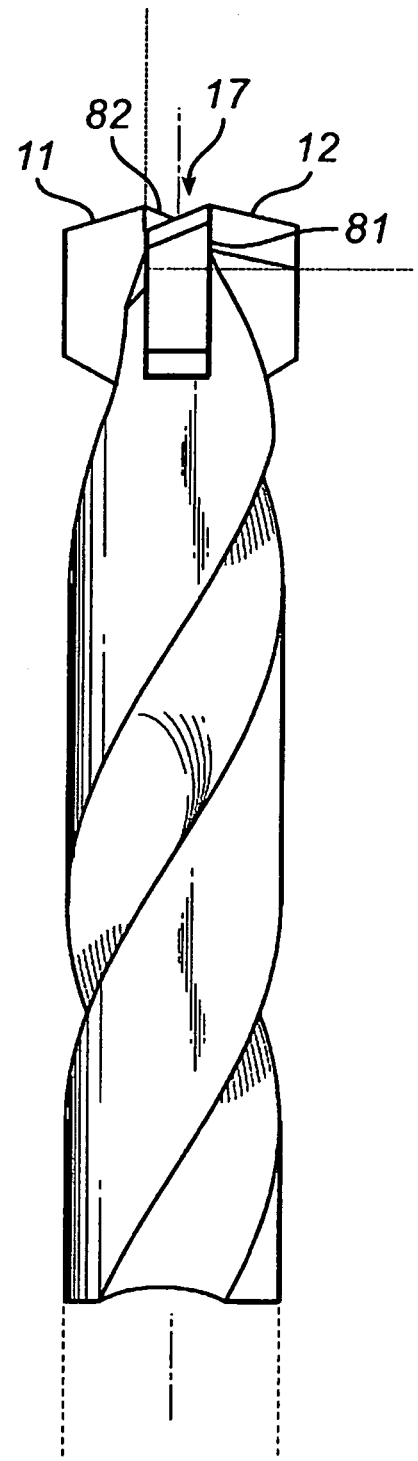
*Fig. 8c*  *Fig. 8d*

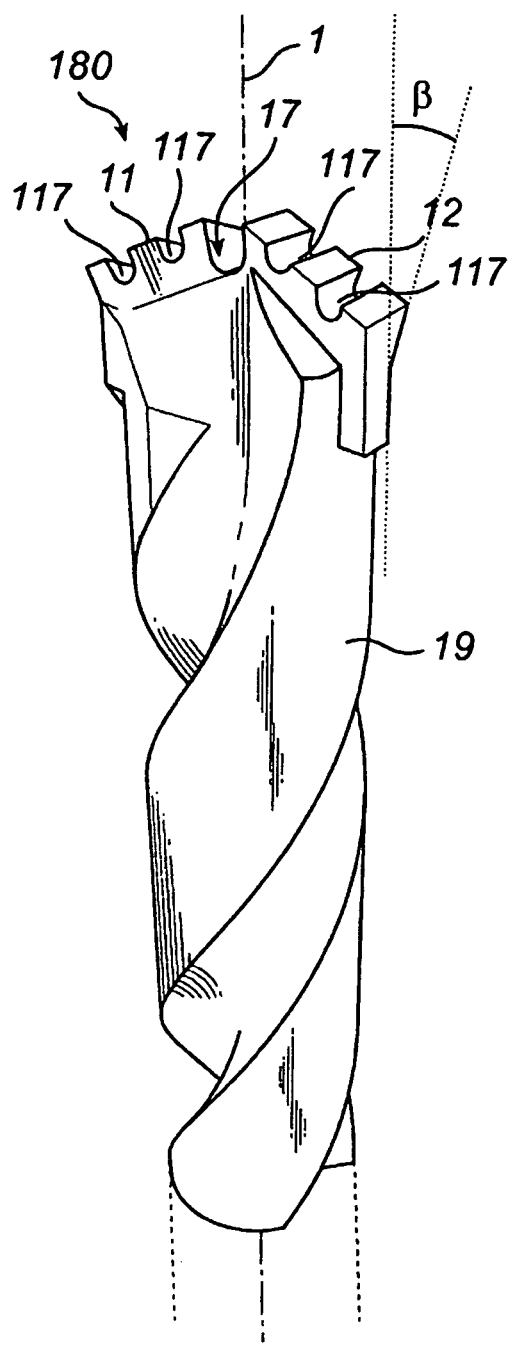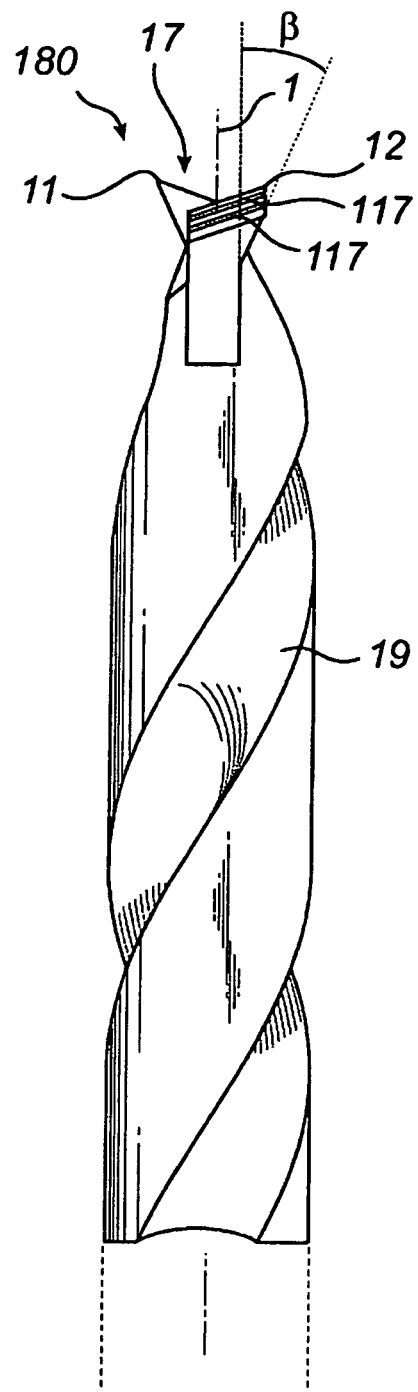
*Fig. 18a*  *Fig. 18b*

ROTARY DRILL

CROSS-REFERENCE TO RELATED APPLICATIONS

This is a national stage of PCT/DK10/000154 filed Nov. 24, 2010 and published in English, claiming the priority of Denmark number PA 2009 70242 filed Dec. 3, 2009, and claiming the benefit of U.S. provisional application No. 61/326,382, filed Apr. 21, 2010, hereby incorporated by reference.

BACKGROUND OF THE INVENTION

1. Field of Invention

The present invention relates to a rotary masonry drill, wherein the drill is provided with at least one groove, of which one groove has a center lying on the axis of rotation of the drill, each said at least one groove extending between two end points defining a groove width, the drill comprises at least two cutting edges, each cutting edge defining a respective cutting angle, the groove comprising a left side and a right side, wherein the groove width is between 0.6 mm and 1.8 mm and the rotary drill has a diameter between 2 mm and 45 mm, and each cutting angle is between 30 and −30 degrees in relation to the axis of rotation.

Furthermore, the present invention relates to a rotary masonry drill comprising a drill bit, wherein the drill bit is provided with at least one groove, of which one groove has a center lying on the axis of rotation of the drill, each said at least one groove extending between two end points defining a groove width, the drill bit comprises at least two cutting edges, each cutting edge defining a respective cutting angle, the groove comprising a left side and a right side, wherein the groove width is between 0.6 mm and 1.8 mm and the rotary drill bit has a diameter between 2 mm and 45 mm, and each cutting angle is between 30 and −30 degrees in relation to the axis of rotation.

2. Description of the Prior Art

Many different drills are available for drilling in different materials. They come in various materials and shapes depending on their purpose. Generally, drills are classified in one of the three main groups tree, metal and masonry. Drills for use in metals are for instance suggested in U.S. Pat. No. 4,373,839 and U.S. Pat. No. 4,687,388.

When drilling in porous materials such as concrete, stone, brick, tile, repair mortar, or any other materials used in masonry construction, including marble, granite, travertine, limestone, glass, etc, usually a hammer drilling machine is used. One of the drill bits known in the art has been described in the British application GB832238A. GB832238A discloses a masonry drill where the tip is shaped as a W. At the center of the W is a shallow cup. The effect of this cup is that the maximum length of the cutting edge of the tip is cutting when the drill is rotated. By providing a cutting edge at the center of the drill, the whole surface of the cone formed during drilling is cut or broken up, thus obviating damage to and overheating of the drill, and enabling the rate of drilling to be increased. From the figures the distance between the end points seem to be about 50% of the diameter of the drill.

Another drill has been described in the U.S. Pat. No. 4,671,710A. U.S. Pat. No. 4,671,710A describes a drill, the drill bit of which has two or more outer cutting edges and is formed with a V-shaped notch. As above, it appears W-shaped. The V-shaped notch has its center lying on the axis of rotation of the drill and opens in the direction of feed of the tool. The V-shaped notch defines inner cutting edges terminating in respective outer cutting edges. The cutting edges functions as chisels. The distance between the edges of the open top V-shaped notch is more preferably between 0.5 mm and 10 mm. From the figure it appears that the groove width is around 30% of the diameter. The description suggests that the groove width should be less than 50%. The object of the prior art disclosure is to reduce thrust load and extend the life of the drill.

A further drill has been described in the German patent application DE10208820A. This document describes a hammer drill for drilling in brickwork and concrete. The tip of the hammer drill comprises a cup-shaped indentation. The width of the cup is around 10-30% of the diameter of the drill. From the drawings it appears that the groove width is wider than the groove depth. The purpose is to reduce wear on the tip of the drill and thereby extend the life of the drill.

However, there are substantial and fundamental differences between hammer drills and drills used for drilling by rotary movement only, or virtually only. A hammer drill, or a hammer drill bit, in a hammer drilling machine rotates in a clockwise direction but is also driven backwards and forward into the material at great speed. The drill vibrates as it is 'hammered' through the material, while a rotary drilling machine cuts the material by its cutting edges. Furthermore a hammer drilling machine may be provided with an SDS socket. This is usually not provided on the rotary drilling machines.

SUMMARY OF THE INVENTION

The object of the present invention is to provide a rotary masonry drill that has a considerable higher drilling rate than regular drills at the same load. Alternatively a similar drilling rate may be obtained using a lower load. It is a further object that the drill can be used in a cordless drilling machine for drilling in a variety of materials, using less load and energy than with hammer drills. Furthermore, it is an object to provide a drill that is improved from an ergonomic point of view, so the vibrations, white fingers and noise of the hammer drilling machine can be avoided.

This object is obtained by providing a rotary masonry drill or a rotary masonry drill bit, wherein the drill/drill bit is provided with at least one groove, of which one groove has a center lying on the axis of rotation of the drill, each said at least one groove extending between two end points defining a groove width, the drill comprises at least two cutting edges, each cutting edge defining a respective cutting angle, the groove comprising a left side and a right side, wherein the groove width is between 0.6 mm and 1.8 mm and the rotary drill has a diameter between 2 mm and 45 mm, and each cutting angle is between 30 and −30 degrees in relation to the axis of rotation. The groove width is generally measured as the imaginary line perpendicular to the left side, the right side or both of the groove.

By providing end points in a certain distance to each other, it is possible to drill deeper at the same pressure and at the same rotational speed, i.e. at the same drilling rate. Surprisingly, in a certain embodiment of the invention, it appears that the groove width does not substantially depend on the diameter of the drill, i.e. the fastest drilling speed is obtained for the same groove width irrespective of the diameter of the drill, even though the greatest improvement is obtained with the smaller drills. Furthermore a cutting angle between 30 and −30 degrees in relation to the axis of rotation provides the drill/drill bit with optimal cutting properties. An angle close to 0 will provide the sharpest cutting; however, in some applications the cutting edge will be experienced as "too sharp"

and might entail that the drill is stuck in the material. A positive angle will give a more even drilling experience, as the risk of the drill getting stuck is reduced, and the transition from a new drill to a drill in which the cutting edge is inevitably slightly chamfered is less noticeable. It is believed that a drill having a negative cutting angle has acceptable drilling qualities combined with the further advantage of being self-sharpening. By having two tips that engages in the material to be drilled in, it decreases the risk of migration of the drill or the drill bit on the material. Hence it is possible to drill a more clean-cut hole. Without wishing to be bound by theory, it is believed that it is the presence of forces perpendicular to the axis of rotation that contributes to the destruction of the pillar that forms continuously in the center of the drilling hole, as the drill/drill bit is moved deeper into the material. This is very different from a traditional drill/drill bit having a tip only, giving rise to a dead center.

The invention is also applicable to drills and drill bits having other dimensions and angles, for instance, a rotary drill or drill bit, wherein the drill is provided with at least one groove, of which one groove has a center lying on the axis of rotation of the drill, each said at least one groove extending between two end points defining a groove width, the drill comprises at least two cutting edges, each cutting edge defining a respective cutting angle, the groove comprising a left side and a right side, wherein the groove width is between 1 mm and 20 mm and the rotary drill has a diameter between 45 mm and 200 mm, and each cutting angle is between 30 and −30 degrees in relation to the axis of rotation.

In a preferred embodiment the groove width is 1.4 mm or less. A groove width of this magnitude makes it easier to center the drill, i.e. the sliding of the drill or the drill bit at the beginning of the drilling is reduced or prevented. To obtain a fast drilling rate the groove width is suitably above 0.7 mm, such as above 1.0 mm, and suitably 1.1 or above.

In another embodiment, the rotary masonry drill/drill bit is provided with a set of at least three grooves, of which the first groove is the groove having a center lying on the axis of rotation of the drill. The presence of grooves outside the central groove on the axis of rotation entails that the drill or drill bit functions as a spoon bit, in which the peripheral grooves, i.e. the grooves outside the central groove, are brought into successive engagement with the material to be drilled.

The number of grooves may be 5, 7 or 9. More grooves are conceivable. The second and subsequent grooves may be provided along the cutting edge between the first groove and the circumference of the drill or drill bit.

The peripheral grooves, i.e. the second and subsequent grooves, may have any suitable shape. For instance, the grooves may be substantially straight, or they may be curved, each groove having a predetermined radius of curvature. The predetermined radius of curvature of each second and subsequent groove may for instance correspond to a radius of a circle. The grooves may be funnel-shaped such that the groove flares out from the cutting edge, i.e. at the opposite edge, where the dust and/or drilled material enter the groove to where the dust and/or drilled material exit the groove. The groove thus has a shape as a frustum of a cone, where it can be imagined that the frustum of a cone shape can be positioned both in a shallow position covering only about 10% of the cutting edge, or covering about 50% of the cutting edge, creating a semicircular cross section of the groove, or covering even up to about 90% of the cutting edge, such that a segment of the frustum of a cone is outside the drill bit. The funnel shape provides for en easier passage of dust and/or the drilled material.

The total area covered by the grooves may for instance lie between 10 and 60%, preferably between 20 and 50%.

It is also believed to be advantageous if each of the second and subsequent grooves has a flared shape such that the groove width at the cutting edge is smaller than the groove width at the opposite edge, as the material cut away during drilling is disposed of more easily.

If advantageous for instance from a manufacturing point of view, the drill bit may comprise two or more drill bit portions. The drill bit portions may be connected to each other.

The rotary masonry drill or drill bit is adapted for drilling in porous materials, for instance selected from the group consisting of tiles, bricks, masonry, concrete, granite, repair mortar, artificial granite, breeze block, capping stone, concrete, hardened roof tiles, marble and ceramic materials. The drill is not limited to use in drilling in these materials, and may be used in connection with any other materials used in for instance masonry construction, including marble, granite, travertine, limestone, or brittle materials, such as glass, etc. The groove may be provided in drills for drilling in a large variety of materials; however, it has proved to be of a particular advantage in terms of its ability to increase the drilling rate and in terms of extending the lifespan of the drill/drill bit due to less wear and tear. When in use, it is important not to use the drill as a hammer drill. Otherwise, the effect of the invention will not be obtained and may have detrimental effect on the drill/drill bit itself. Thus, the drilling machine should perform a rotation of the drill only with no pulsating axial movement thereof. As a consequence, it has turned out to be possible to drill in materials, in which the drilling in the prior art has hitherto only been possible by the use of the hammer function. By avoiding the hammer function, the disadvantages of vibrations, white fingers and noise is avoided. As a further consequence, it has turned out be possible to drill a clean-cut hole in ceramic materials as well as in glass material.

In an embodiment of the invention the left side and the right side of the groove are parallel to each other or form an angle of less than 30 degrees relative to each other. Such angles, for instance less than 20 degrees or essentially parallel to the axis of rotation of the drill, and thereby creating a sharper angle, the area where no cutting is taking place is limited, and thus a reduced thrust load is required to remove the material from the dead center and hence, the cutting edges are exposed to less wear. The angle may also be less than 0 degrees, meaning the groove is wider at the bottom than between the two end points.

The drill or the drill bit may comprise three or four cutting edges. By having more than two cutting edges the wear will be distributed over more cutting edges and the drill will have a longer life. The three or four cutting edges may be either outer cutting edges or inner cutting edges or a combination there of.

The distance between the two end points may be smaller than a length of a bottom of the groove. This provides the drill or the drill bit with a greater resistance to breaking.

The diameter of the rotary drill may also be equal to or smaller than 9 mm, 8 mm, 6 mm, 5 mm or 4 mm. In particular with a diameter of 9 mm or less, a relative greater improvement in the drilling rate was seen than with the larger drills or drill bits. The diameter of the rotary drill or drill bits may also be equal to or greater than 5 mm, 6 mm, or 8 mm. Thus, in a certain embodiment of the present invention, the drill diameter is in the range of 5.0 mm to 9.0 mm and the groove width is in the range of 1.0 mm to 1.5 mm. To obtain the fastest drilling rate and at the same time an easy centering of the drill it is preferred that the diameter of the rotary drill is in the range of 6.0 mm to 9.0 mm and the groove width is in the range of 1.1 mm to 1.4 mm.

In another embodiment of the invention the diameter of the rotary drill may be equal to or greater than 15 mm, 16 mm, 18 mm, 20 mm, 22 mm, 24 mm, 26 mm, 28 mm, and 30 mm. The groove width is suitably in the range of 1.0 to 1.5 mm, preferably in the range of 1.1 to 1.4 mm for obtaining a fast drilling rate as well as an easy centering of the rotary drill. The groove may be deeper than it is wide. By having this relationship between the groove depth and the groove width the drill cuttings or drill column accumulated in the dead center has a greater room where it can work before it is either crushed against the bottom or turned into dust or ground by the forces perpendicular to the axis of rotation. Consequently the drill meets less resistance and less thrust load or forces perpendicular to the axis is required.

The groove may also be U-shaped. This means that there are no sharp angles where drill cuttings may build up.

Additionally the rotary drill may be mounted in a drilling machine, which performs rotary movements without significant pulsating axial movements. Hence the hammering or other percussive function is not switched on. By significant is meant that movements in its axial direction will naturally occur when drilling a hole, but by significant is meant axial movement that is provided by a hammering or percussive function as such on the drilling machine, that is, not the movements made by hand and the vibrations that may naturally be present when drilling a hole.

By not using pulsating axial movements the drill or the drill bit will have cutting edges that are sharper for a longer time; furthermore the absence of the pulsating axial movements makes it easier to drill in tile or paving stone without the risk of breaking the tile or stone.

Furthermore, the two end points may also preferably be located at the same distance from the axis of rotation in order to provide equal wear on both of the end points.

Additionally, the drill may be mountable in electrically powered drilling machines or tools. The drill or drill bit may be used for drilling by means of cordless drilling tools also in materials in which it is not at present practically feasible to drill, such as concrete, stone, brick repair mortar etc.

The rotary drill or drill bit may comprise two end points positioned along a line of the left side and the right side of the groove respectively, and at a distance from the cutting edge. By cutting off the top of the end points, which are usually positioned along the cutting edge, the end points are positioned closer to the axis of rotation, providing a better control over the drill and a more cylindrical and less oval bore. Additionally the material being drilled will subsequently have a smoother surface around the hole and no or considerably less corrugations around the bore.

Usually when drilling a larger hole, it is necessary to drill a smaller hole first, in order to secure that that drill doesn't slide. However by positioning the end points, which are positioned at the outermost end of the drill, closer to the axis of rotation, predrilling is no longer neccesary as the required grip between the material to be drilled and the drill is obtained right away.

Each of the cutting edges of the rotary drill or drill bit may additionally comprise a slanted surface extending between the groove and the respective cutting edge. An angle of the slanted surface may be between 20-55 degrees, preferably between 30-45 degrees in relation to the left side and the right side respectively.

The slanted surface may be triangular. The triangular shape may have straight lines or arched lines.

A width of the slanted surface may constitute no more than ⅓ of the length of the cutting edge, preferably no more than ¼ of the length of the cutting edge and most preferably no more than ⅕ of the length of the cutting edge. By keeping the extent of the slanted surface limited, it is secured that it still has sufficient cutting abilities, while it is easier to control and the edges around the bore is without corrugations.

A smaller slanted surface may be positioned opposite the main or larger slanted surface. This is indicated on FIG. 24. This helps to strengthen the drill and thereby reduce the risk of small chips coming of during use of the drill.

The two end points may furthermore be positioned substantially on a center line or in a distance from the center line of until 15% preferably 10% or less of the diameter of the drill or drill bit. The center line extends through the axis of rotation. When the end points are positioned substantially on the center line or within a distance of 15% of the drill diameter, the drilling is even more improved, providing smoother edges around the bore and an even firmer grip, reducing the risk of the drill slipping. Predrilling is not required as is usual for drills with just one dead center point. The groove may be perpendicular to the center line or plane.

The groove may also be at an angle, such as 45 degrees to the center line or plane or between 90 and 45 degrees to the center line or plane.

The corners of the groove, where the bottom of the groove abuts the sides of the groove, may be rounded. The advantage of rounded corners is that rounded corners are more durable than square or angular corners.

Again, without wishing to be bound by theory, it is believed that it is the presence of forces perpendicular to the axis of rotation that contributes to the destruction of the pillar forming continuously in the center of the drilling hole, thus avoiding the dead center present in drills having a minor tip with a maximum height of the depth of the groove.

This effect is believed to be even more pronounced in the embodiments in which the drill or drill bit is provided with a set of three or more grooves, of which a first groove is located on the axis of rotation.

There are certain differences between a rotary or cutting drilling machine and a hammer drilling machine. A drill bit in a hammer drilling machine rotates in a clockwise direction but is also driven backwards and forward into the material at great speed. The drill vibrates as it is 'hammered' through the material, while a rotary or cutting drilling machine cuts the Furthermore a hammer drilling machine may be provided with an SDS socket. This is usually not provided on the cutting or rotary drilling machines.

Often you may find a rotary hammer drill, where the hammering function may be switched on and off.

BRIEF DESCRIPTION OF THE DRAWINGS

Examples of the invention will now be explained below with reference to the drawings. Like numbers apply to like features throughout the application. Although all drawings only show a drill bit it is to be understood that it is a part of a drill with thread(s) extending up the shaft.

FIGS. 8c and 8d show a further embodiment of the invention in a perspective view and a side view respectively wherein there are four cutting edges and each cutting edge has an angle of 0 degrees relative to the axis of rotation.

FIGS. 18a and 18b show an eleventh embodiment of the invention in a perspective view and a side view respectively.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
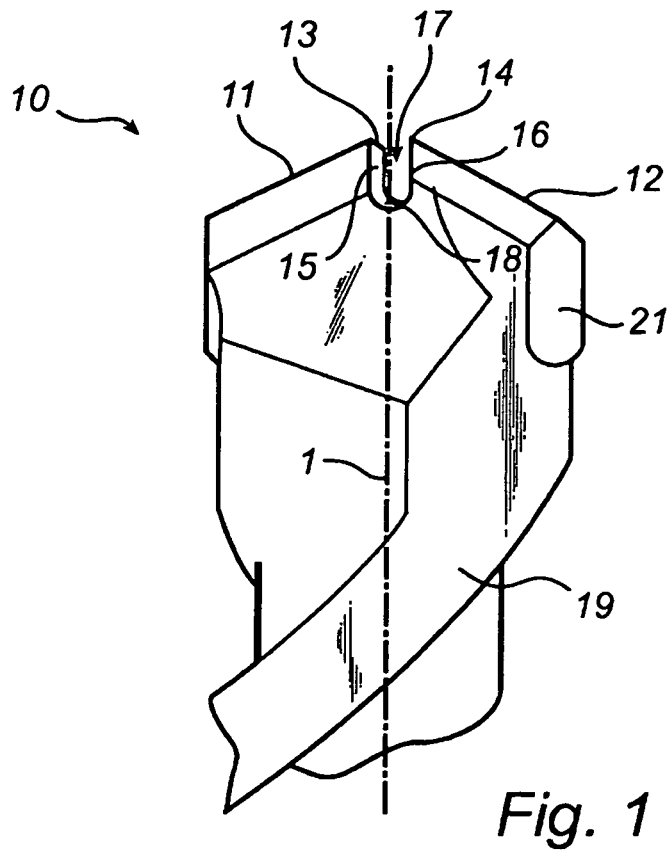
FIG. 1 shows a perspective view of a first embodiment of the invention.

FIG. 1 shows a drill having a drill bit 10 comprising a left cutting edge 11 and a right cutting edge 12, and a left end point 13 and a right end point 14 positioned at the end of the respective cutting edges, a left side 15 parallel to a right side 16 of the groove 17, which together with the bottom 18 defines the groove 17. The bottom 18 is arched or U-shaped. The bottom is perpendicular to the axis of rotation. The bottom may also be inclining to each side forming a peak in the dead center. This may assist in leading drill cuttings away from the groove 17. FIG. 1 also shows a general structure of a drill body 19, however this structure varies depending on, brand, purpose etc. This specific embodiment is a masonry drill, suitable to drill in porous materials. However, other types of drills could also be used.

In the present application, the term "drill" is used for denoting a drill in general. The term "drill bit" is used when the drill is provided with an element that is joined to the drill by any suitable joining technique.

The groove depth may depend on the diameter 24 of the drill and the groove width 23, according to a number of factors. The groove depth is preferably larger than the groove width 23. The groove width may be between 2-30% of the diameter 24, measured at the end points. As particularly favorable ratios, 10-30%, or 13-20%, may be mentioned. The groove depth may be between 3-75% of the diameter 24. The groove depth may be between 100-300% of groove width 23, more preferably 150-250% of groove width 23. The groove depth is measured along the axis of rotation from the bottom 18 to where the groove width 23 is indicated as a dotted line. The relationship between the diameter 24, the groove width 23 and the groove depth applies to the subsequent embodiments as well.

The head 21, which may or may not be larger than the remaining part of the drill, may be made of tungsten carbide with mixed in diamond ground. Other suitable compositions may also be used such as steel, high speed steel, titanium coated bits or cobalt. The same applies to the subsequent embodiments.

Even though two cutting edges 11, 12 are provided on this embodiment, three or more cutting edges may also be provided. These may preferably be provided as outer cutting edges. The subsequent embodiments may also be provided with three or four cutting edges.

Figure 2:
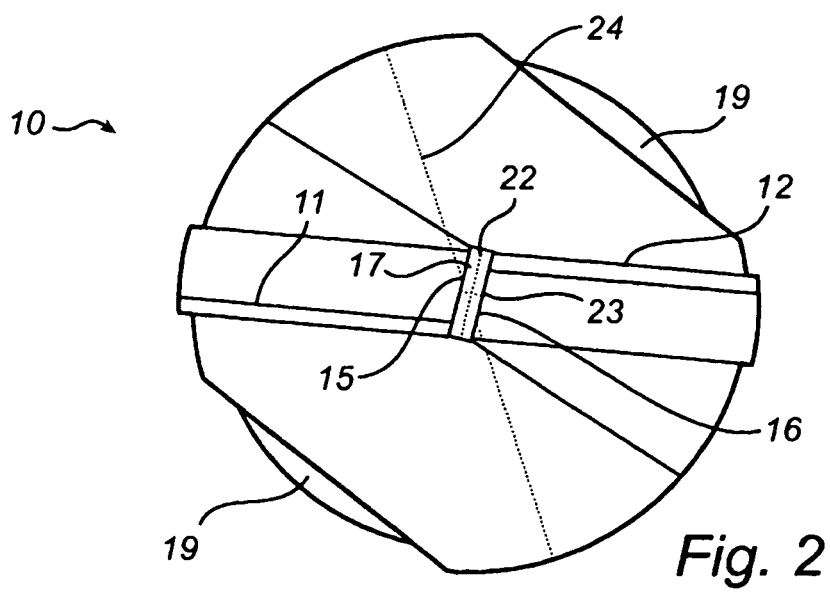
FIG. 2 shows a view along the axis of rotation of the first embodiment of the invention.

FIG. 2 shows a view along the axis of rotation of the first embodiment of the invention. Here, the groove 17 connects the left cutting edge 11 and the right cutting edge 12 at each end of the groove 17. However the cutting edges 11, 12 may also be positioned across from each other or positioned at an angle to the radius and not along the radius. In any event, the cutting edges do not pass through the axis of rotation. The diameter 24 of the head may be wider than the diameter of the body 19. However, the diameter 24 of the head is the diameter 24 of the drill, even though the diameter of the body might be smaller. The length 22 of the bottom is longer than the distance defining the groove width 23 between the two end points. The length of the groove is measured at the bottom of the groove.

Figure 3:
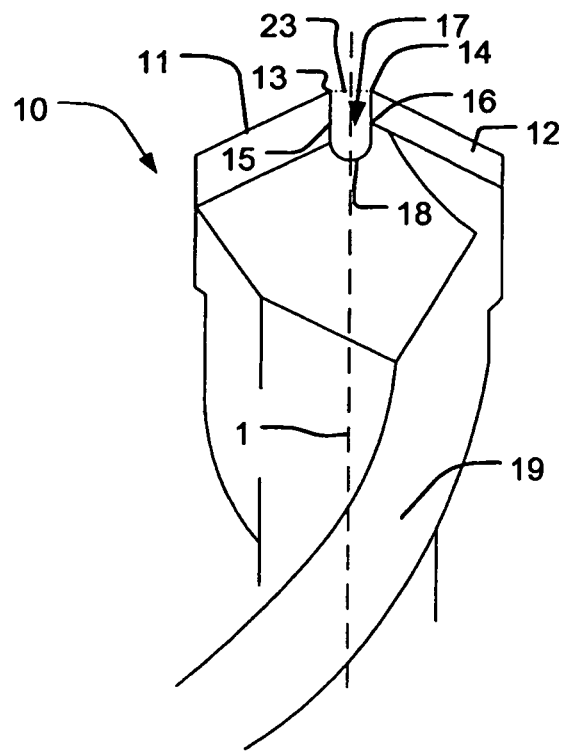
FIG. 3 shows a side view of the first embodiment of the invention.
Figure 7:
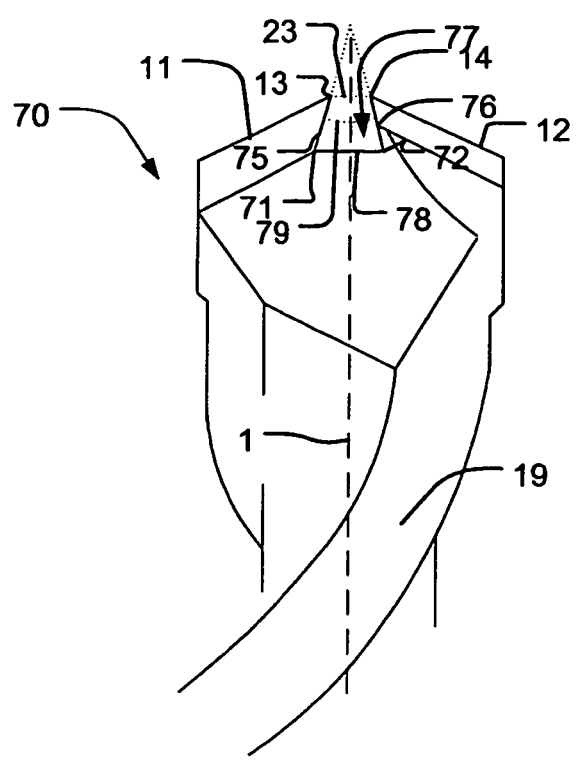
FIG. 7 shows a side view of a fifth embodiment of the invention.

FIG. 3 shows a side view of the first embodiment of the invention. The distance 23 is measured between the end points 13, 14. The distance 23 is the same between the end points as well as along the left and right sides 15, 16. Only when reaching the U-shaped bottom 18, the distance is reduced. The groove 17 may also be V- or Π-shaped; by Π-shaped is meant a bottom that is flat, as can be seen in FIG. 4 and FIG. 7.

Figure 4:
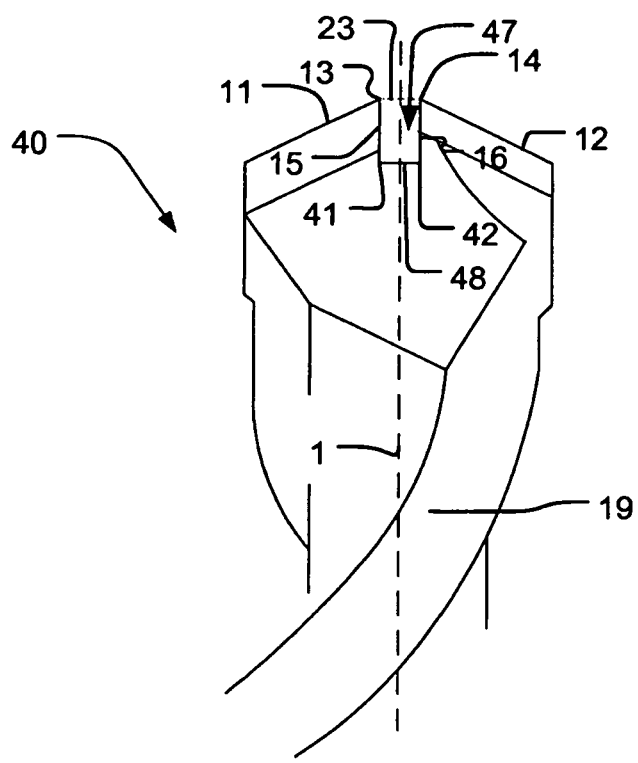
FIG. 4 shows a side view of a second embodiment of the invention.

FIG. 4 shows a side view of a second embodiment of the drill bit 40. This embodiment comprises that same features as the first embodiment, however the groove 47 has a different shape. The bottom 48 of the drill is flat. The corners 41, 42 are sharp but may be rounded. The end points 13, 14 may be rounded. An example of the latter may be seen in FIG. 6.

Figure 5:
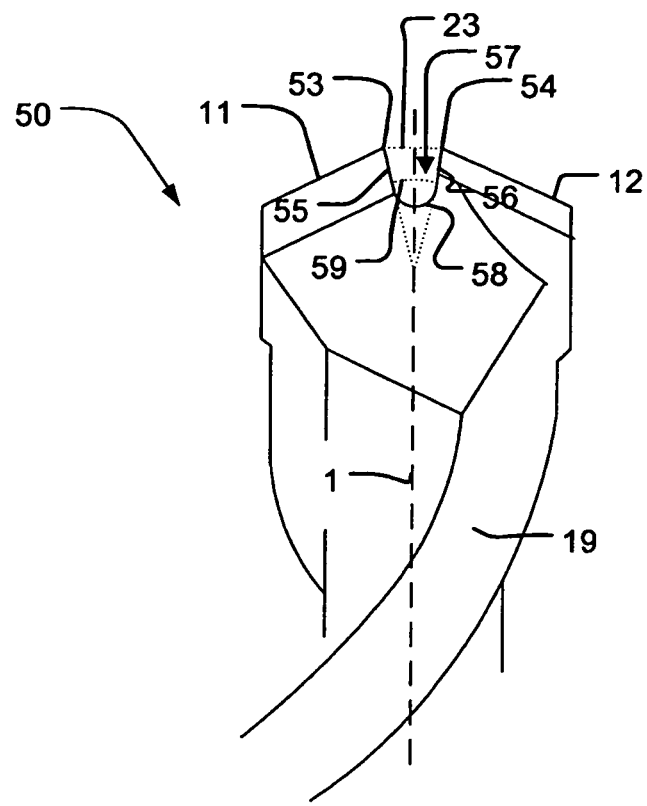
FIG. 5 shows a side view of a third embodiment of the invention.

FIG. 5 shows a side view of a third embodiment of a drill bit 50. This embodiment comprises that same features as the first embodiment, but here the left side 55 and the right side 56 are positioned slightly inclined such that the left side and the right side form an angle 59 relative to each other. The angle is preferably less than 30 degrees, more preferably less than 20 degrees. The angle 59's point of origin is located within the drill and is theoretical in relation the actual groove 57, which does terminate in the angle 59's point of origin. The end point 53, 54 are positioned with the same distance from the axis of rotation 1. However, the distance from e.g. the end point 53 to the axis of rotation 1, may be different from the distance from the end point 54 to the axis of rotation 1. The end points 53, 54 has a slightly different angle between the cutting edges 11, 12 and the sides 55, 56 than the end points in FIG. 1-3, they may furthermore be rounded as is the case in FIG. 6. The bottom 58 is arched but it may also be flat.

Figure 6:
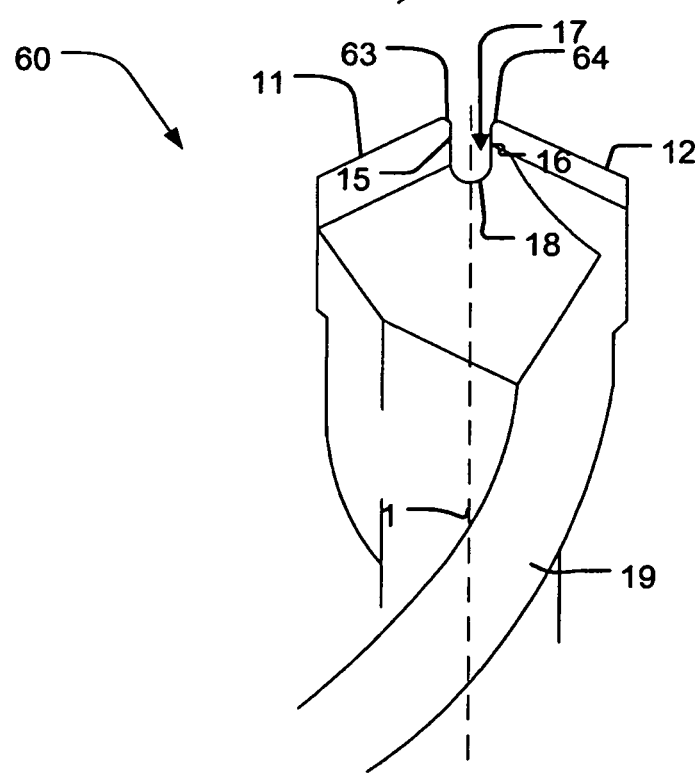
FIG. 6 shows a side view of a fourth embodiment of the invention.

FIG. 6 shows a side view of a fourth embodiment of a drill bit 60. This embodiment is similar to the first embodiment the only difference being that the sharp end points has been replaced by the respective left and right rounded end points 63 and 64. However, this may compromise the function of the invention, as the two opposed edges are more prone to migrate along the surface.

FIG. 7 shows a side view of a fifth embodiment of the drill bit 70. This embodiment comprises the same features as the first embodiment, except here the sides 75, 76 have been angled to the opposite side, creating a trapeze-shaped groove 77. This creates a negative angle in relation to the angle in FIG. 5. The angle 79's point of origin is now placed outside the drill. This angle may well be greater than the angle in FIG. 5 as the angle 79 do not sacrifice the drill's ability to center as the angle is getting larger. This is because the position of the end points 13, 14 and also the groove width stay the same. The angle may be between −1 and −110 degrees, preferably above −80 degrees.

The bottom 78 has been extended in comparison to the other embodiments, leaving more room for the drill column and drill cuttings to work. The extra room assists with removing the pressure from the drill cuttings gathered in the groove 77 on the material to be drilled and for this reason less thrust load or pressure in the axial direction or perpendicular to the axis is required when drilling the hole.

The groove width 23 is still measured between the end points 13 and 14. The corners 71, 72 may be rounded in order to avoid that drill cuttings accumulate. The bottom 78 may also be rounded or U-shaped.

Figure 8A:
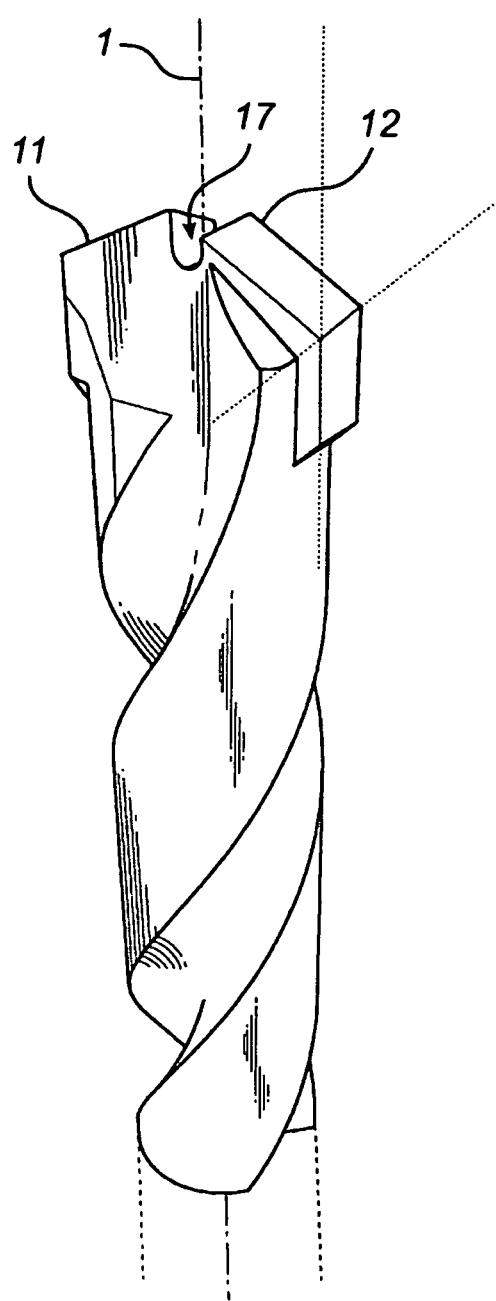
FIGS. 8a and 8b show a sixth embodiment of the invention in a perspective view and a side view respectively wherein the cutting edge has an angle of 0 degrees relative to the axis of rotation.
Figure 8B:
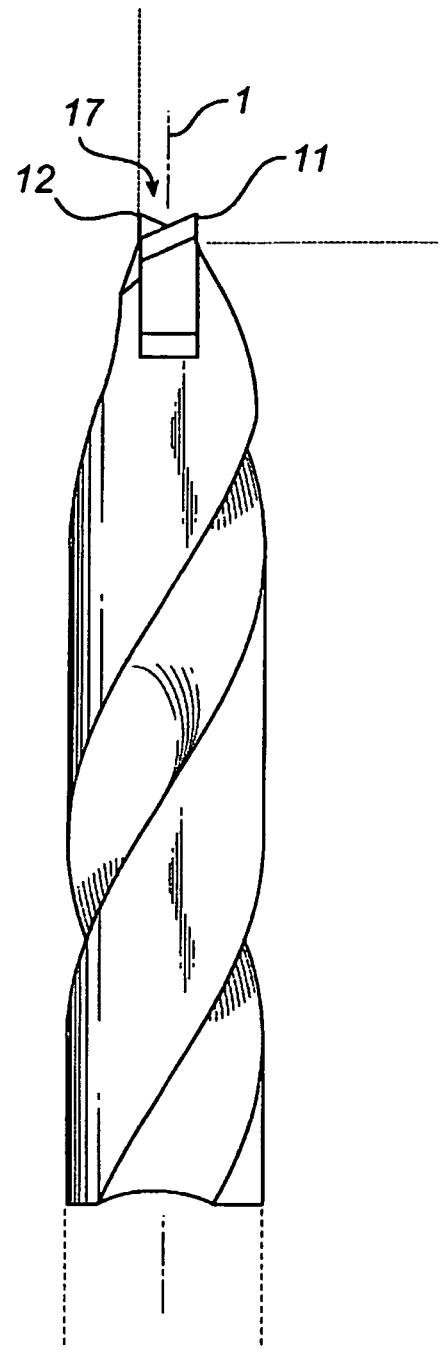

FIGS. 8*a* and 8*b* shows a preferred embodiment of the invention, which a drill bit where the cutting edge 11, 12 is parallel to the axis of rotation. Hence, the angle between the cutting edge and the axis of rotation is 0 degrees.

The functioning of the drill or drill bit according to the invention is believed to be the following: The two cutting edges 11, 12 engage with the material to be drilled along two lines positioned at a distance from each other. As the drill is moved into the material, a pillar is formed continuously in the area defined by the groove. Due to the forces that arise in a perpendicular direction relative to the longitudinal axis, the pillar is continuously destroyed. This is, i.a., based on the recognition that many materials are able to withstand large compressive forces but are considerably less resistant to tensional load.

FIGS. 8*c* and 8*d* show a further embodiment of the invention in a perspective view and a side view respectively wherein there are four cutting edges and each cutting edge has an angle of 0 degrees relative to the axis of rotation. The groove is thus two-dimensional and resembles a deep cup having a U-shaped cross section. However, the functioning of the four-edge drill corresponds to the functioning of a drill having two cutting edges.

Figure 9A:
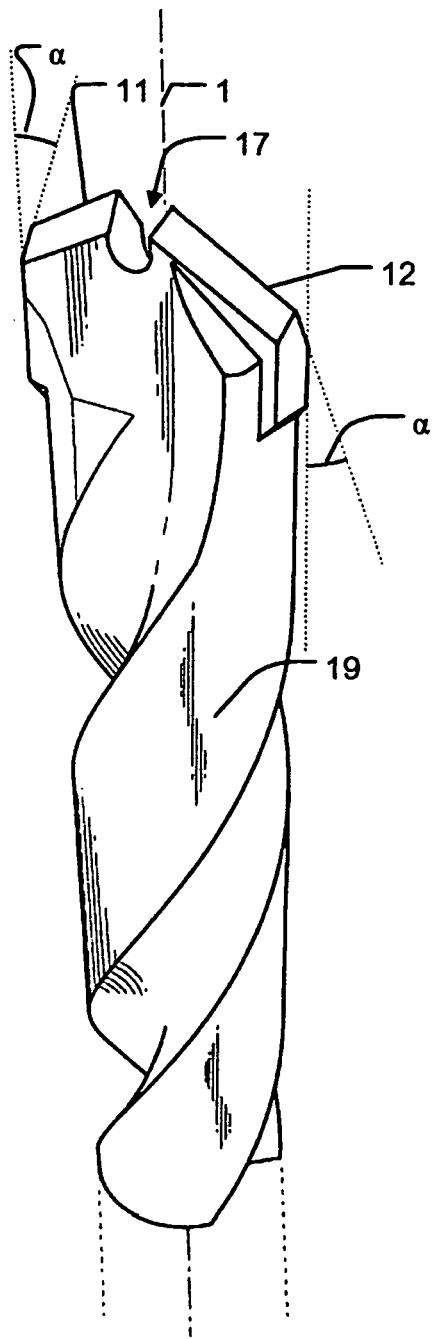
FIGS. 9a and 9b show a seventh embodiment of the invention in a perspective view and a side view respectively wherein the cutting edge has an angle of 18 degrees relative to the axis of rotation.
Figure 9B:
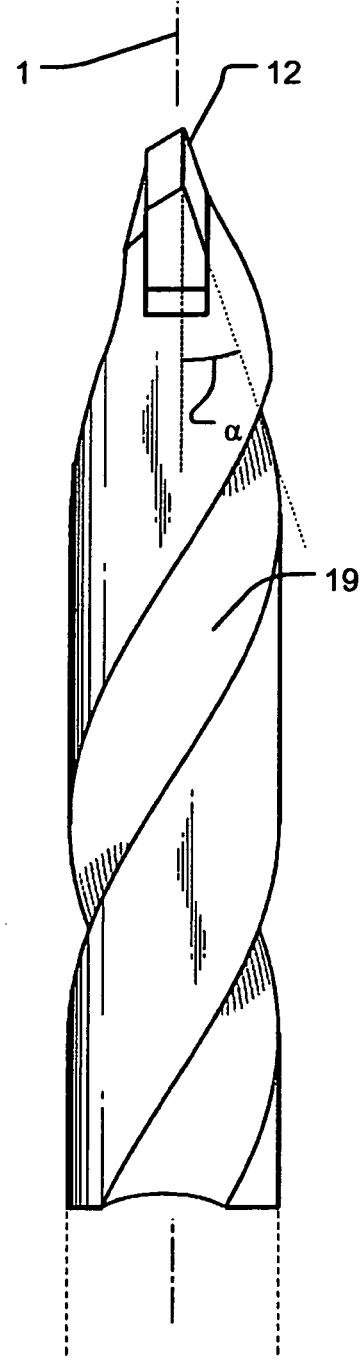

FIGS. 9*a* and 9*b* show a drill bit where the cutting edge 11, 12 has a positive angle α in relation to the axis of rotation. This applies to either one or all of the cutting edges. The angle may be 18 degrees. The angle may be between 0 and 18 degrees. The angle may be between 9 and 18 degrees. The angle may be larger than 18 degrees, even up to 30 degrees, as may be seen in FIGS. 9*c* and 9*d* below.

Figure 9C:
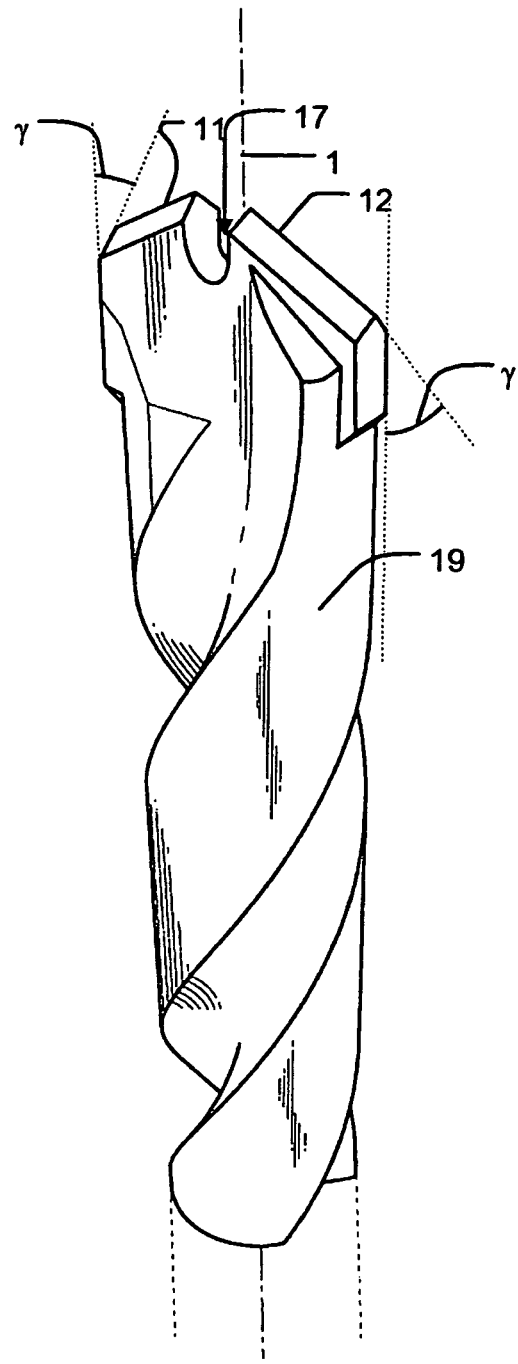
FIGS. 9c and 9d show a still further embodiment of the invention in a perspective view and a side view respectively wherein the cutting edge has an angle of 30 degrees relative to the axis of rotation.
Figure 9D:
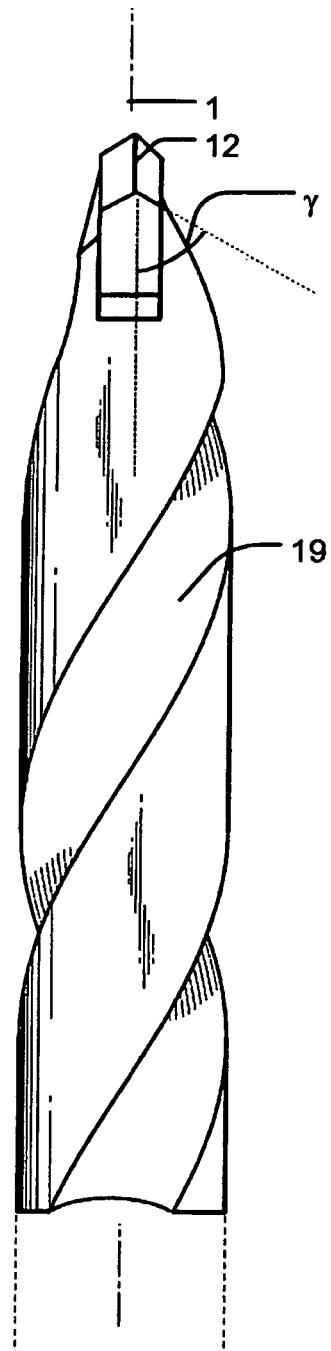

FIGS. 9*c* and 9*d* show a still further embodiment of the invention in a perspective view and a side view respectively wherein the cutting edge has an angle of 30 degrees relative to the axis of rotation.

Figure 10A:
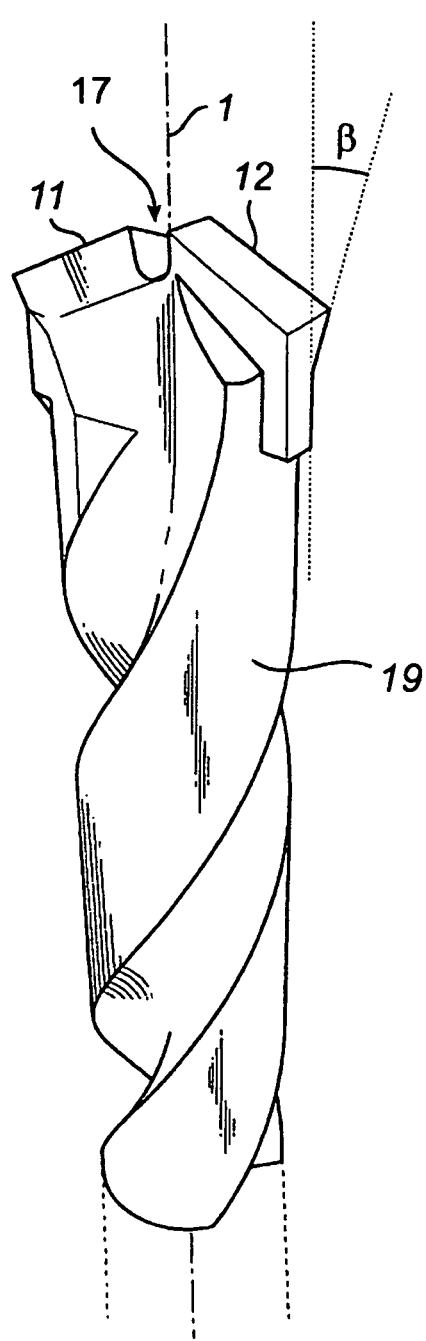
FIGS. 10a and 10b show an eighth embodiment of the invention in a perspective view and a side view respectively wherein the cutting edge has an angle of −30 degrees relative to the axis of rotation.
Figure 10B:
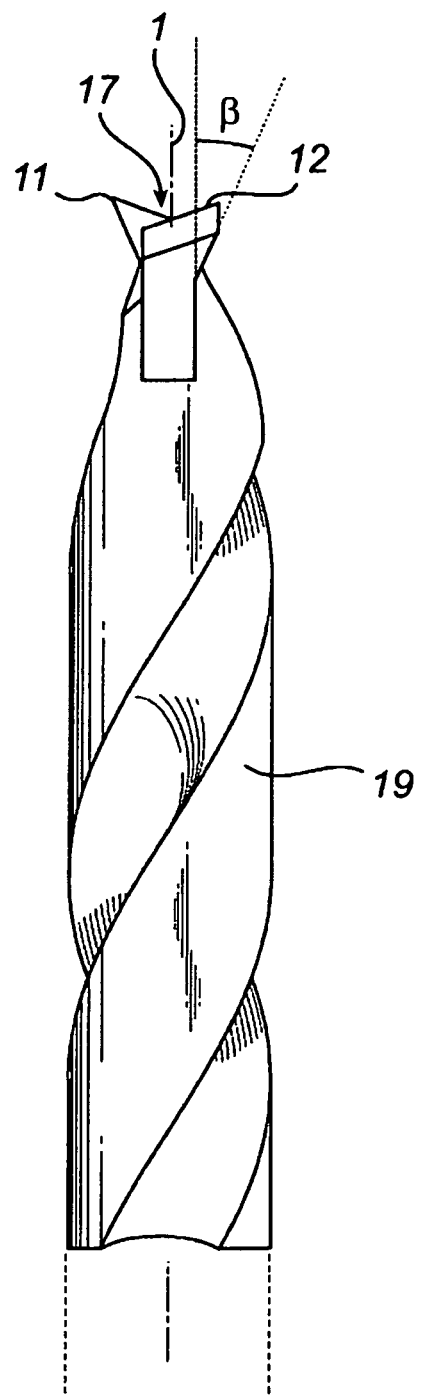
Figure 11:
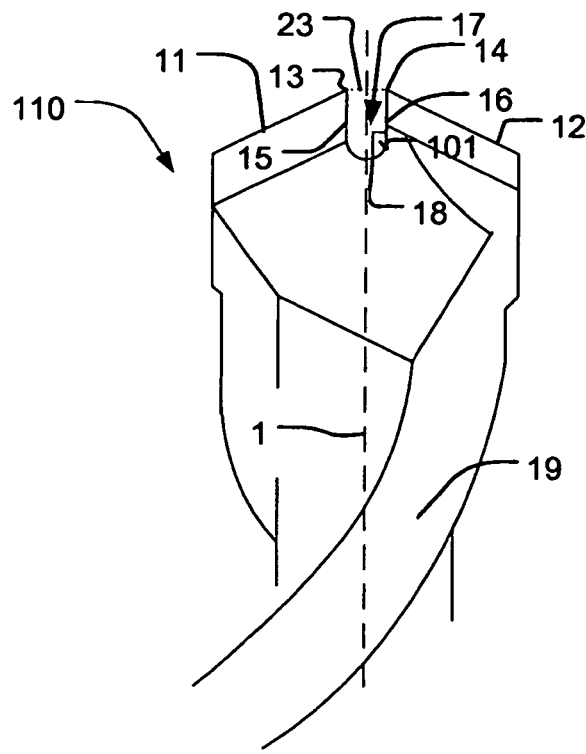
FIGS. 11 to 15 show alternative embodiments of embodiment three to seven
Figure 12:
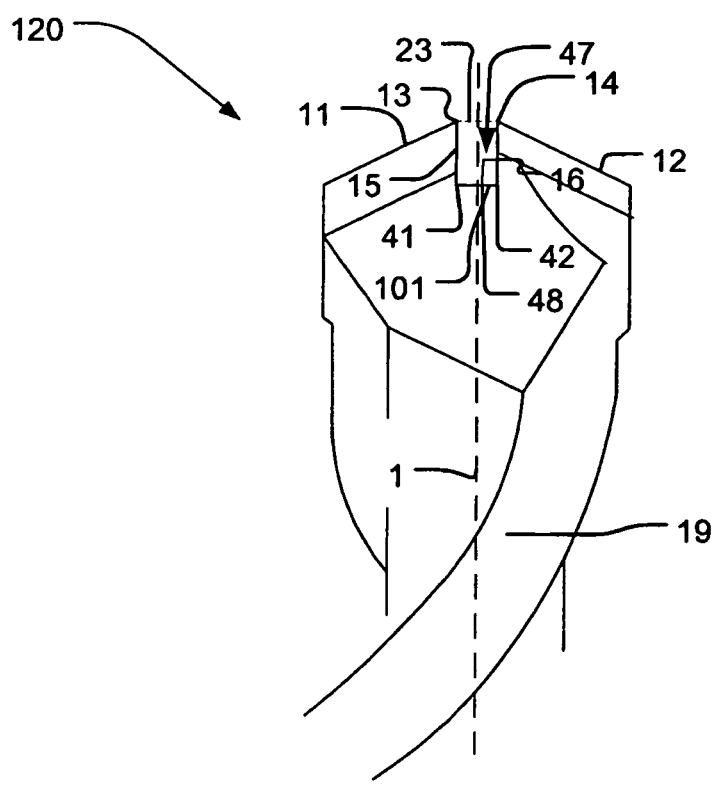
Figure 13:
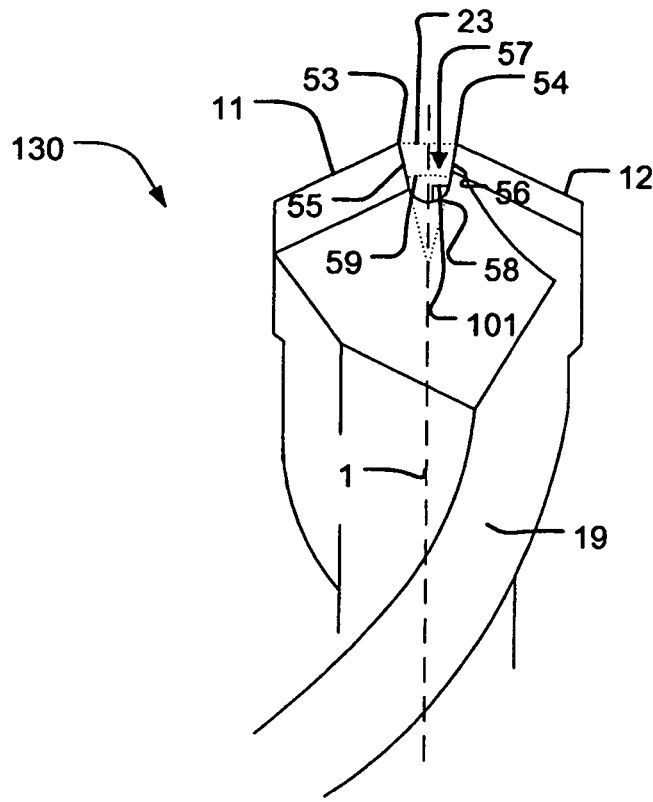
Figure 14:
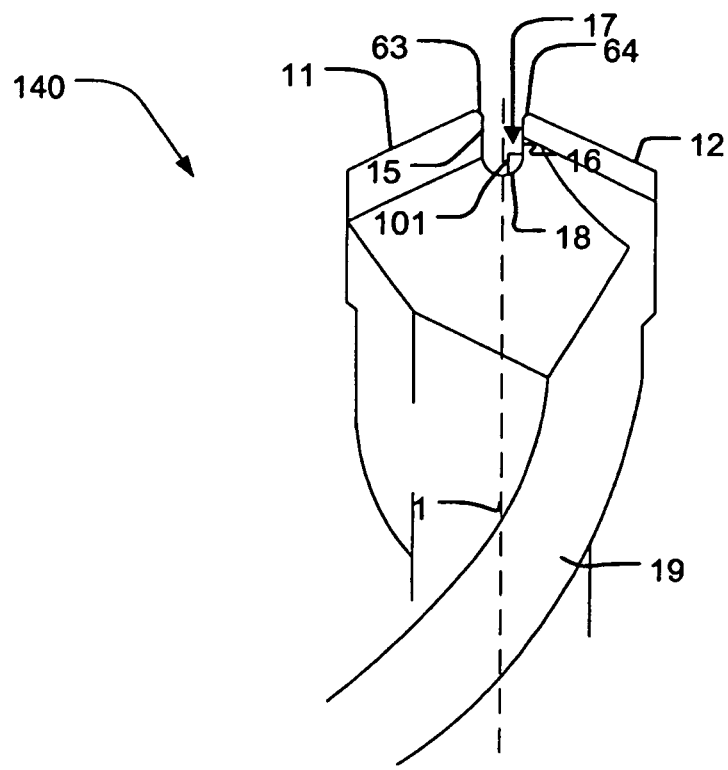
Figure 15:
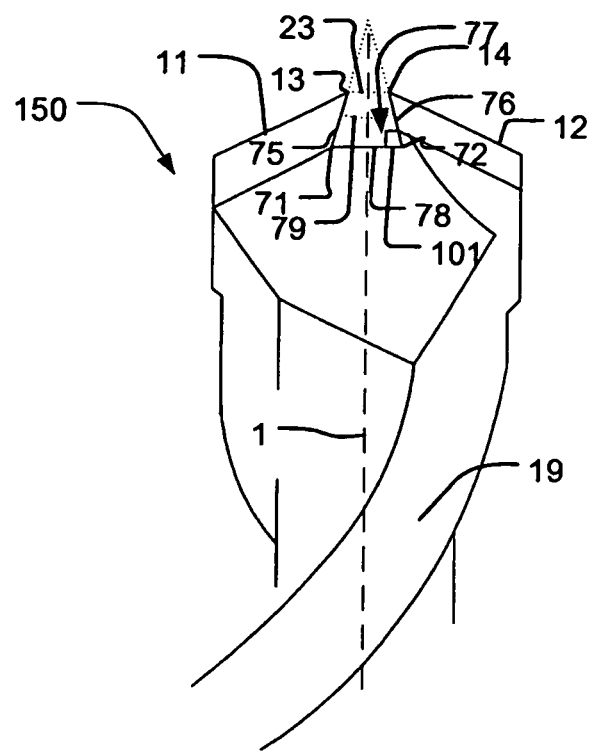

FIGS. 10*a* and 10*b* show a drill bit where the cutting edge 11, 12 has a negative angle β in relation to the axis of rotation. This applies to either one or all of the cutting edges. The angle may be −30 degrees. The angle may be between 0 and −30 degrees. The angle may be between −15 and −30 degrees. The angle may be smaller than −30 degrees.

FIGS. 11-15 comprise the same features as described under FIGS. 3-7 respectively. The drill bit further comprises a tap 101. The tap 101 is positioned at the bottom of the groove. The tap 101 has a height of 20-60% of the depth of the groove. The tap 101 may be positioned on the opposite side of the drill bit. The tap 101 may be positioned on both sides of the drill bit. The tap 101 makes it easier to break down the material that may build up in the groove.

In the embodiments shown in FIGS. 16*a* to 21*b*, a set of grooves is provided in the drill or drill bit. Only differences with respect to the above-mentioned embodiments will be described in detail.

Figure 16A:
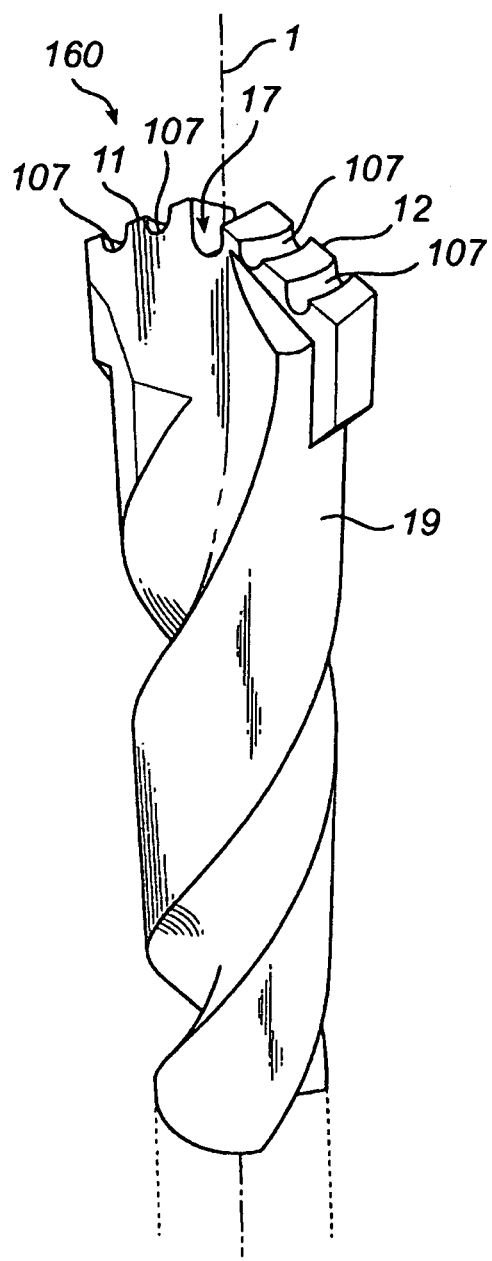
FIGS. 16a and 16b show a ninth embodiment of the invention in a perspective view and a side view respectively.
Figure 16B:
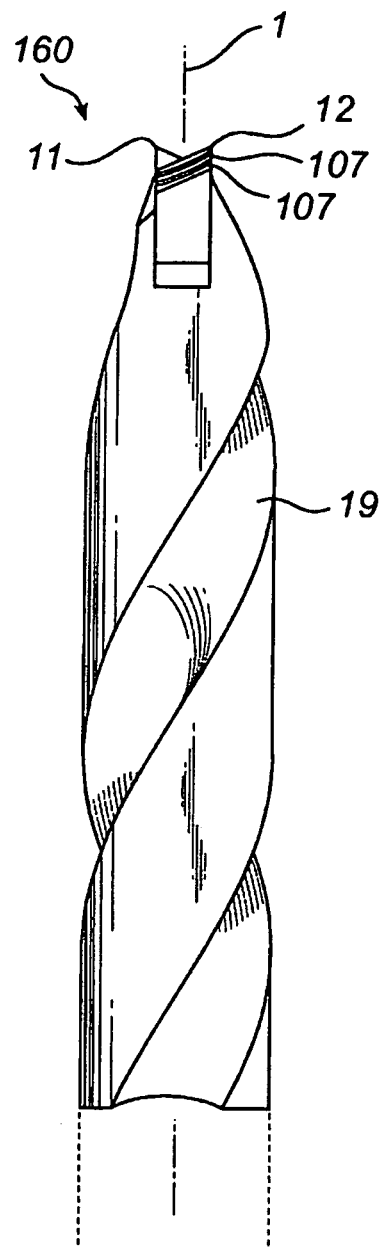

In the embodiment of FIGS. 16*a*-16*b*, the drill bit 160 is provided with a set of at least three grooves, of which the first groove 17 is the groove having a center lying on the axis of rotation of the drill. There are two peripheral grooves 107 radially outside the central groove on each side of the central groove 17. The peripheral grooves 107 are provided along the cutting edge between the first groove 107 and the circumference of the drill bit, i.e. the outer dimensions measured in a direction in parallel with the cutting edges.

The peripheral grooves, i.e. the second and subsequent grooves, may have any suitable shape. For instance, the grooves may be substantially straight as shown in FIGS. 18*a*-18*b*, 19*a*-19*b* and 21*b*. Alternatively, they may be curved as shown in FIGS. 16*a*-16*b*, FIGS. 17*a*-17*b* and 20*a*-20*b*. In case the grooves are curved, each groove has a predetermined radius of curvature. The predetermined radius of curvature of each second and subsequent groove may for instance correspond to a radius of a circle.

The total area covered by the grooves may for instance lie between 10 and 60%, preferably between 20 and 50%.

It is also believed to be advantageous if each of the second and subsequent grooves has a flared shape such that the groove width at the cutting edge is smaller than the groove width at the opposite edge, as the material cut away during drilling is disposed of more easily.

If advantageous for instance from a manufacturing point of view, the drill bit may comprise two or more drill bit portions. The drill bit portions may be connected to each other.

Figure 17A:
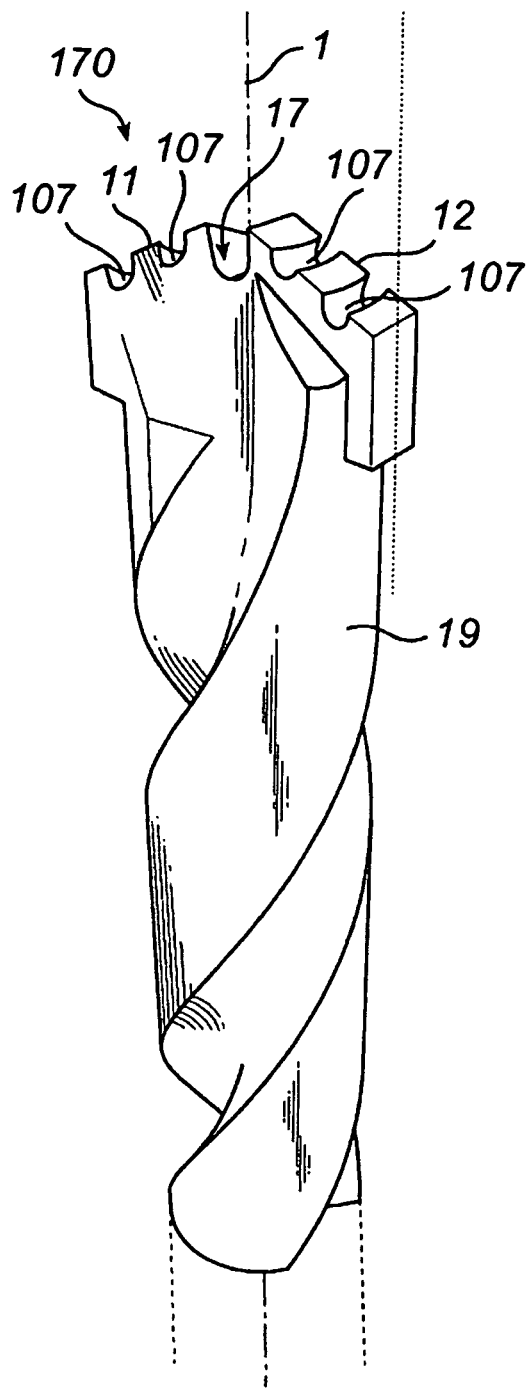
FIGS. 17a and 17b show a tenth embodiment of the invention in a perspective view and a side view respectively.
Figure 17B:
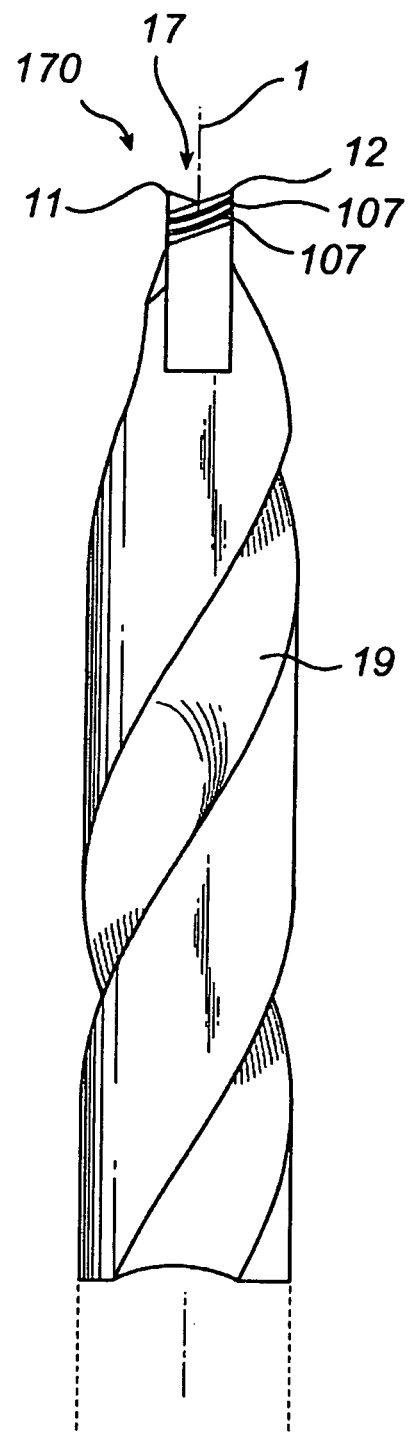
Figure 19A:
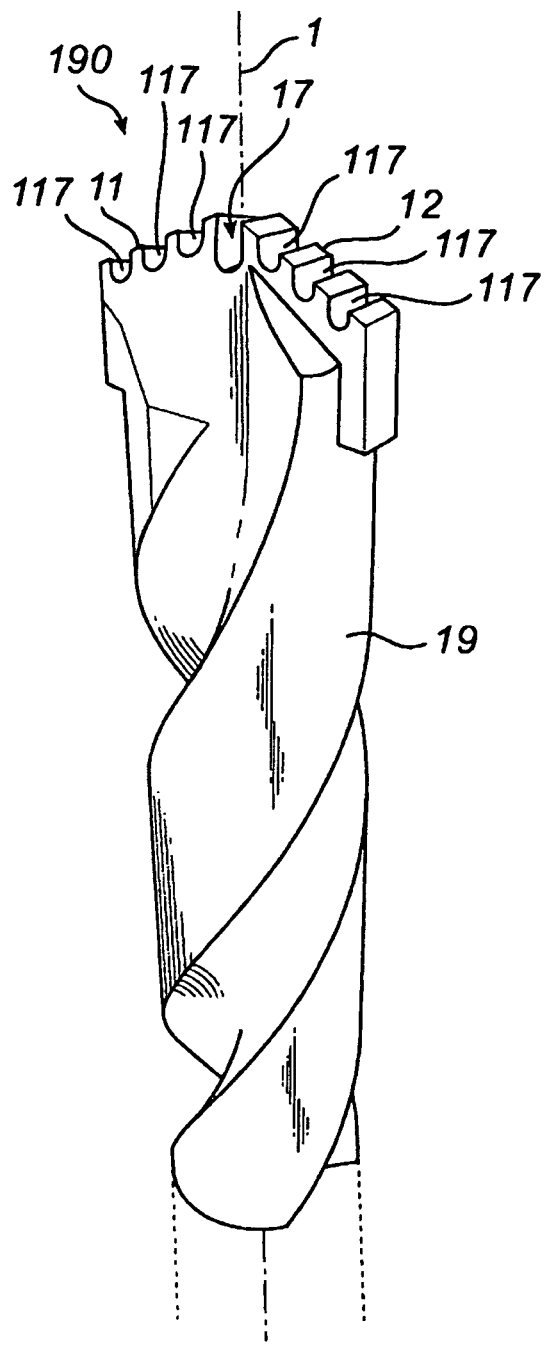
FIGS. 19a and 19b show a twelfth embodiment of the invention in a perspective view and a side view respectively.
Figure 19B:
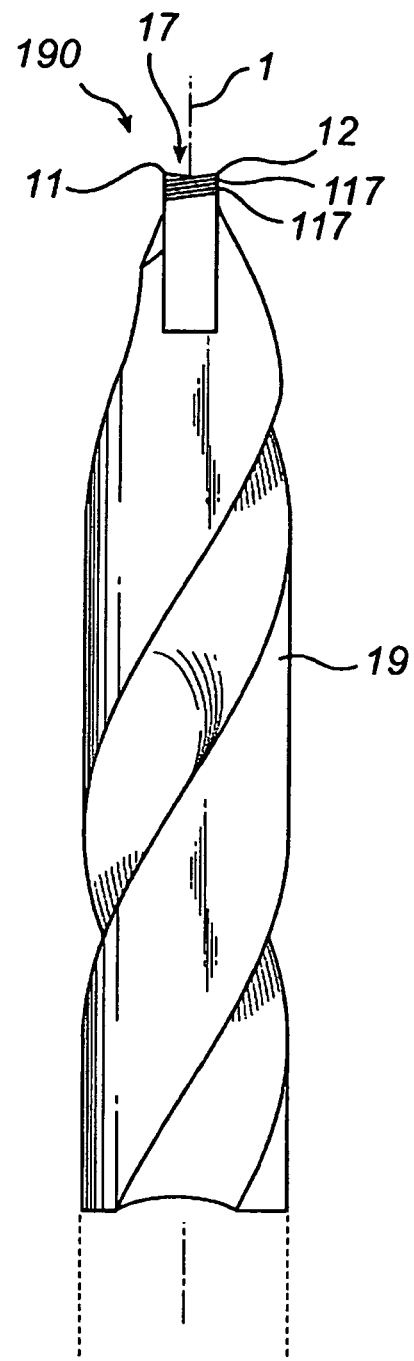
Figure 20A:
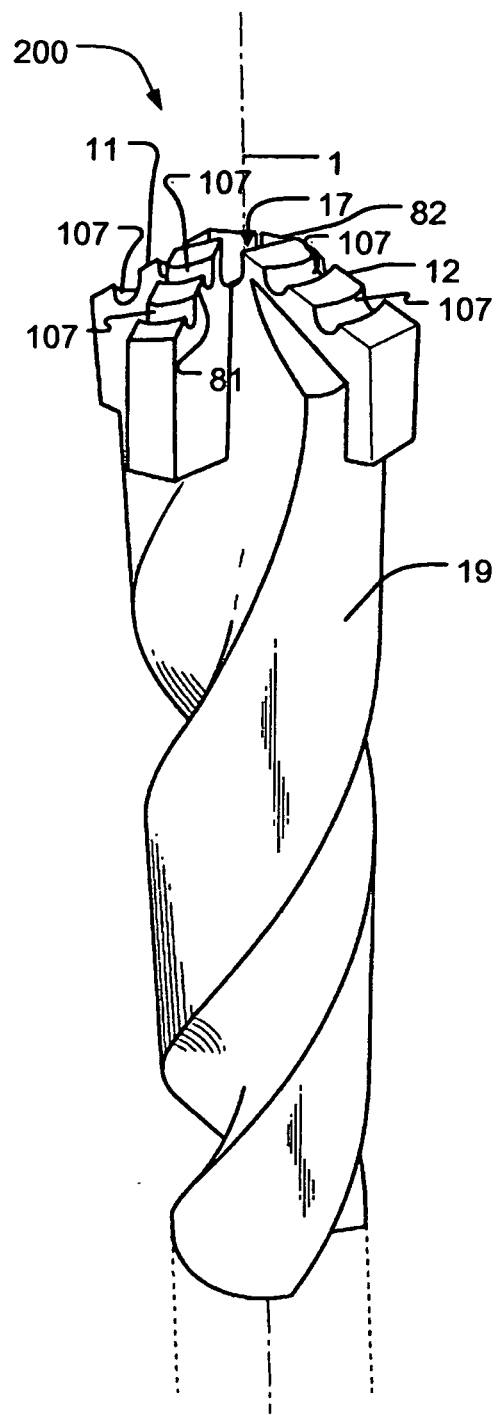
FIGS. 20a and 20b show a thirteenth embodiment of the invention in a perspective view and a side view respectively wherein there are four cutting edges and each cutting edge has an angle of 0 degrees relative to the axis of rotation.
Figure 20B:
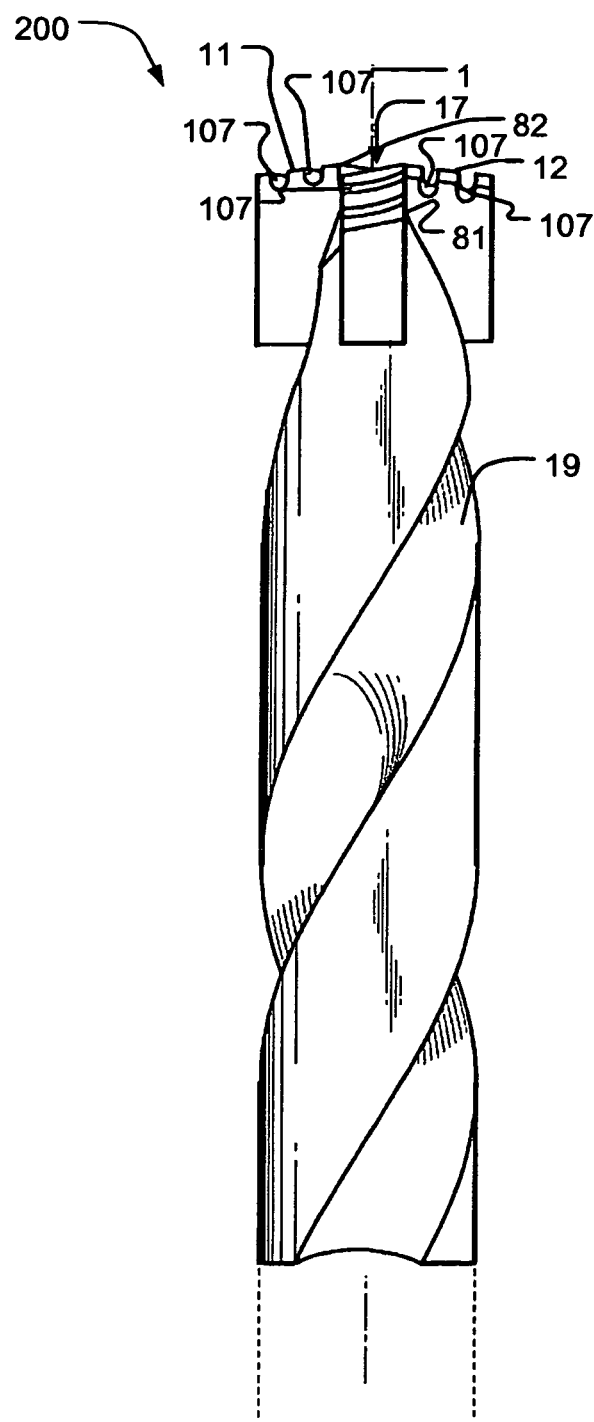
Figure 21A:
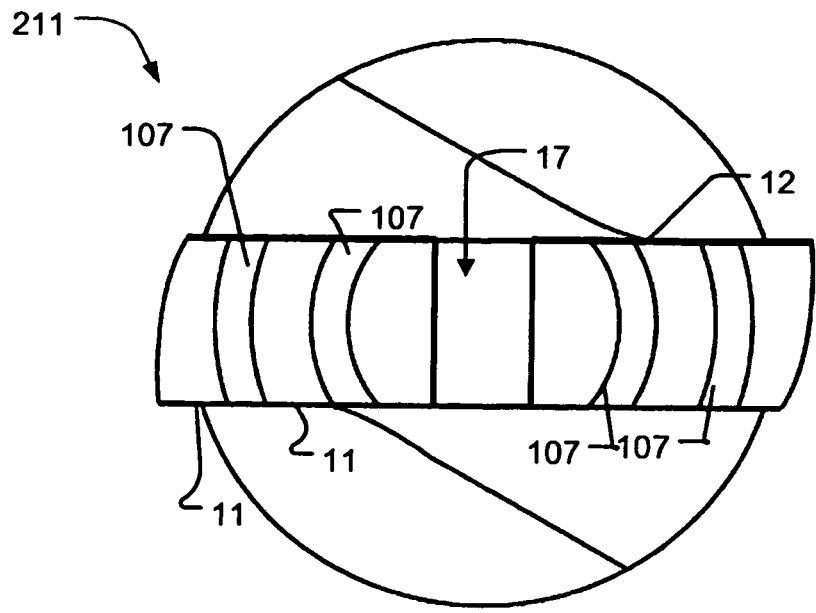
FIGS. 21a and 21b are plan views along the axis of rotation of the embodiments shown in FIGS. 17a-17b and FIGS. 18a-18b, respectively.
Figure 21B:
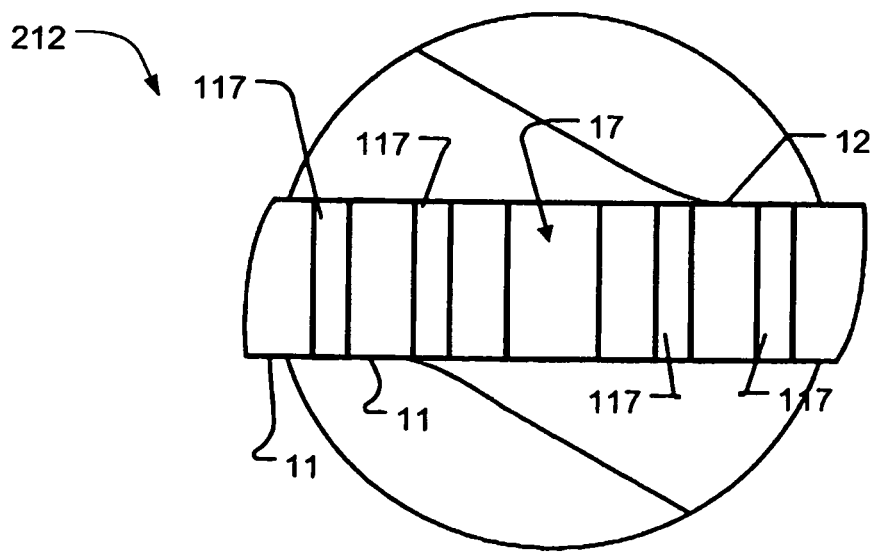

In all of the embodiments FIGS. 16*a*-21*b*, the drill bit may have an almost rectangular or a substantially trapezoid shape seen from the side, cf. the difference between the drill bit 190 of the embodiment of FIGS. 19*a*-19*b* relative to the embodiment of for instance the drill bit 170 of FIGS. 17*a*-17*b*. The cutting angle may be varied as in the above-mentioned embodiments having a central groove along the longitudinal axis. This is exemplified in FIGS. 18a-18b, in which the drill bit 180 has an angle of −30 degrees.

Figure 22:
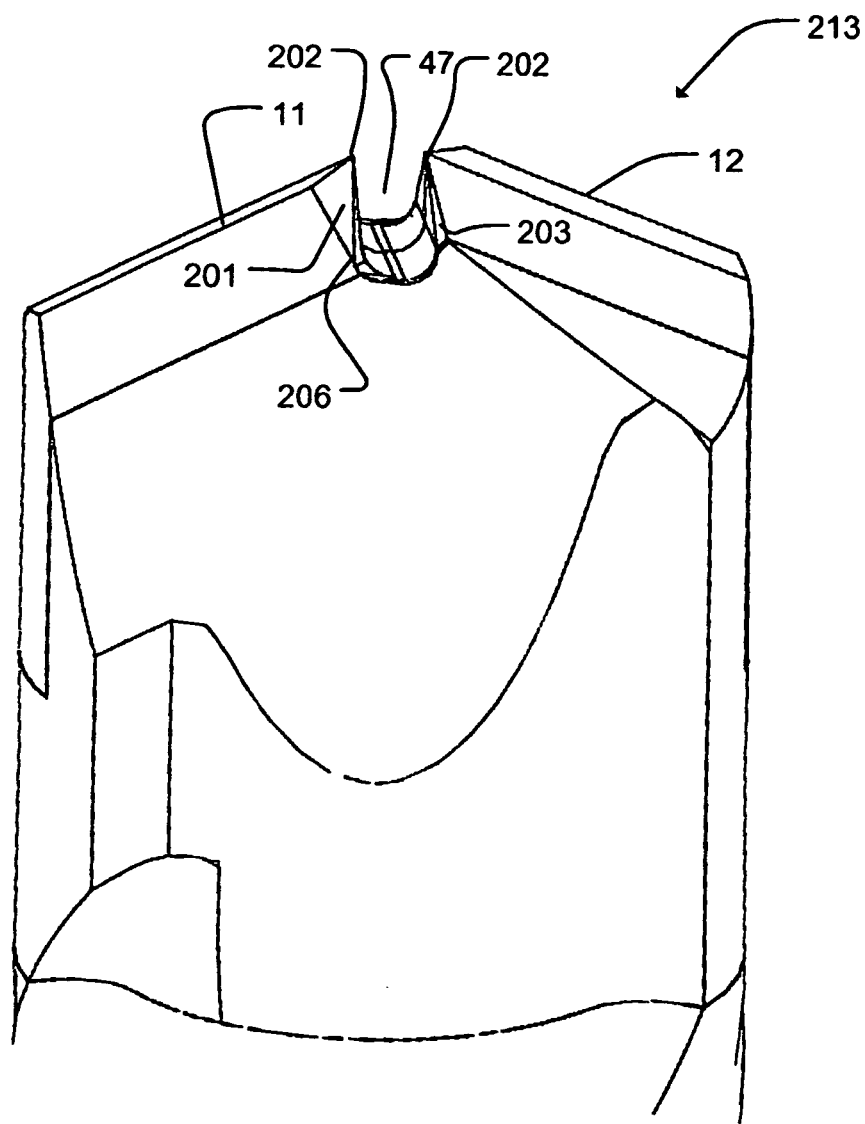
FIGS. 22-24 show a fourteenth embodiment of the invention in a side view, a perspective view and a top view respectively.
Figure 23:
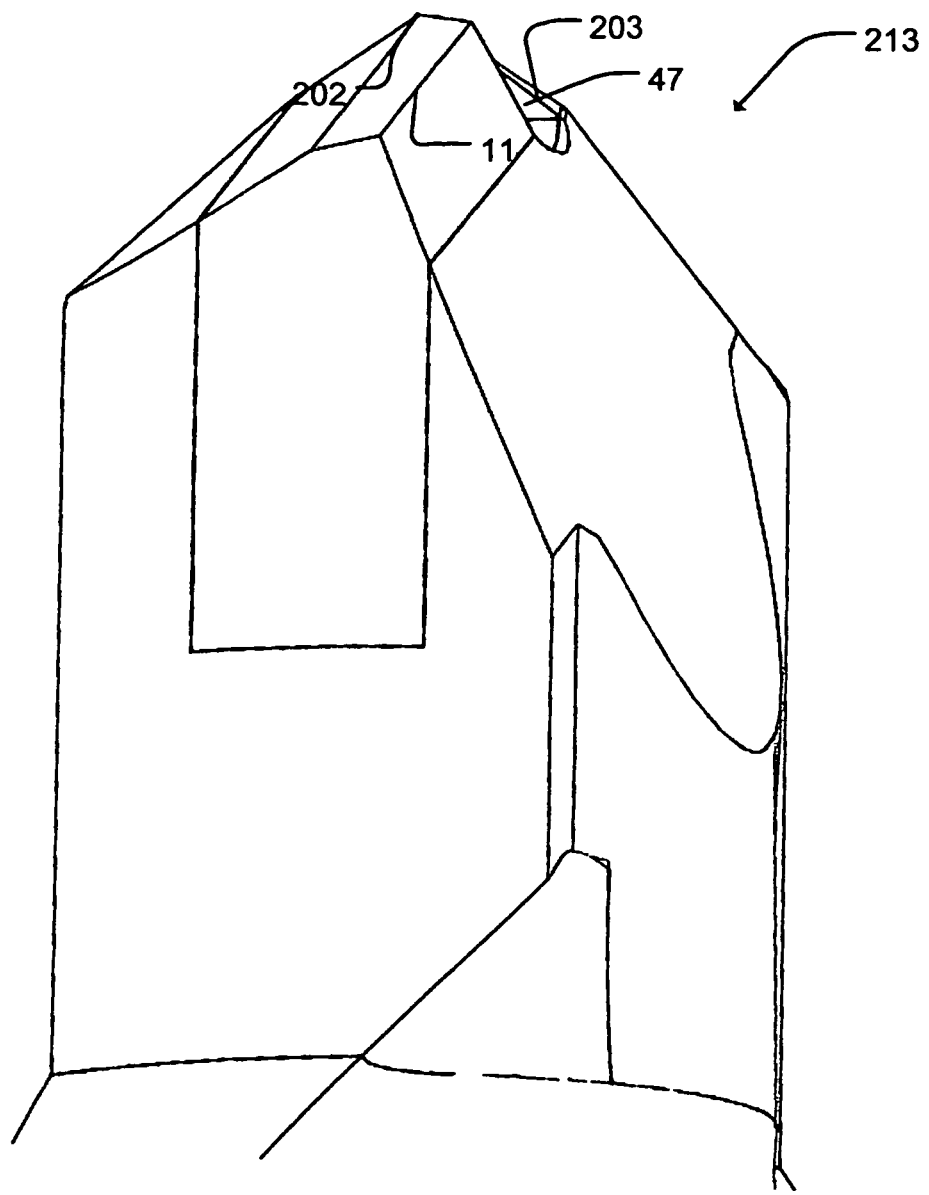
Figure 24:
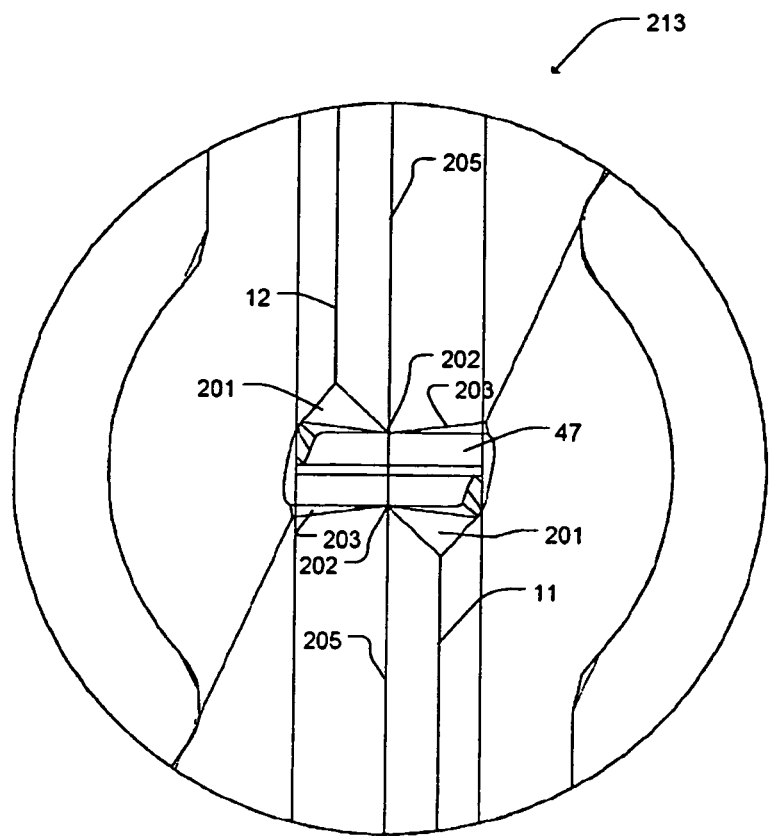

FIGS. 22-24 show another embodiment of the present invention.

The embodiment in FIGS. 22-24 is slightly different from the other embodiments but the feature of this embodiment, the slanted surface(s), may be combined with any feature of the other embodiments.

FIG. 22 is a side view of a drill bit 213, comprising two cutting edges 11, 12, and a groove 47 along the axis of rotation. The groove has a rounded bottom. The width of the groove is 0.8 mm in this embodiment, the groove may be a different size. The drill bit 213 further comprises a slanted surface 201. The slanted surface 201 is provided on both sides of the groove 47. The slanted surface 201 has a triangular shape. The slanted surface 201 is abutting the side of the groove 47. The length of the slanted surface 201, which extends from the end point 202 to the point 206, is 1.24 mm in this embodiment, but the length may vary between 0.5 mm and the depth of the groove, such as 3 mm. This depends on the size of the drill. The drill in this embodiment is an 8 mm drill. A larger drill may require a longer slanted surface. The end point 202 of the triangle and of the drill bit is positioned closer to the axis of rotation than is the case in some of the other embodiments. The angle of the slanted surface in relation to the side of the groove may be between 20-55 degrees, preferably between 30-45 degrees. A smaller slanted surface 203 may be positioned opposite the slanted surface 201. Each slanted surface 201 should constitute no more than ⅓ of the cutting edge, preferably no more than ¼ of the length of the cutting edge and most preferably no more than ⅕ of the length of the cutting edge 11, 12.

FIG. 23 shows a perspective view of the top of the drill bit. The end point 202 is clearly positioned closer to the axis of rotation than would be the case if the end point had been positioned along the cutting edge.

FIG. 24 shows a top view of the drill bit 213. Here it is more clearly shown how the end point 202 is positioned closer to axis of rotation and on the actual center line 205 extends through the head, perpendicularly to the axis of rotation, and that the end point 202 is no longer positioned on the line of the cutting edge 11. The center line 205 may not be visual on the drill, meaning the center line may also be an imaginary line. FIGS. 25a-d show another embodiment of a drill or drill bit 214. It is a slightly different version of the drill bit according to the invention, where the head of the drill 204 is plane, whereas in the embodiment shown in FIGS. 22-24 the head is provided with inclined surfaces. The features indicated on FIGS. 22-24 are also present on FIGS. 25a-d. The same reference numbers apply.

Figure 26:
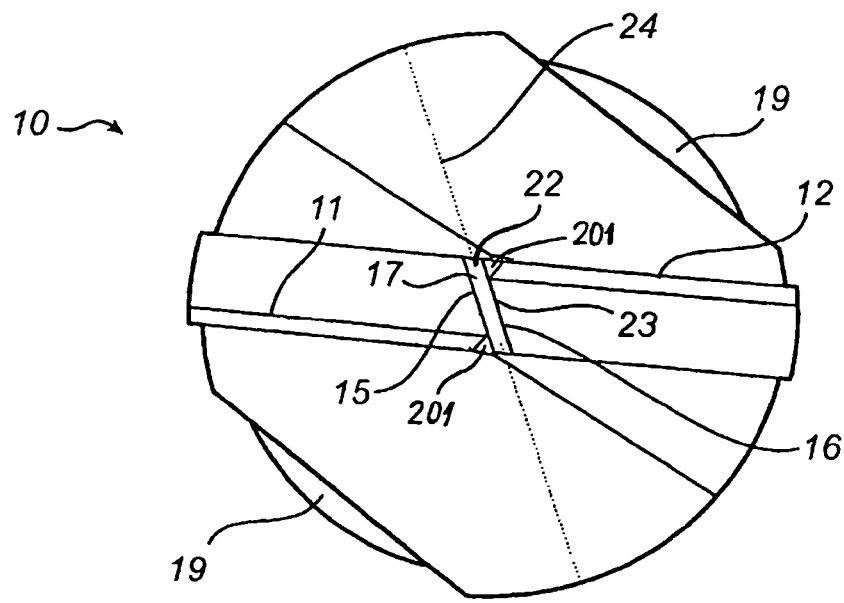
FIG. 26 discloses an embodiment similar to the embodiment shown in FIG. 2, however, slanted surfaces are provided in the groove.
Figure 25A:
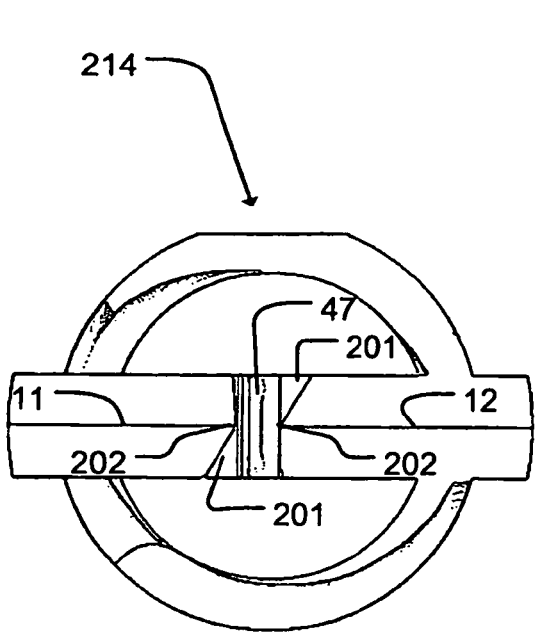
FIGS. 25a-d show a fifteenth embodiment of the invention in a top view, a perspective view, a side view and a zoomed out view of the drill respectively.
Figure 25B:
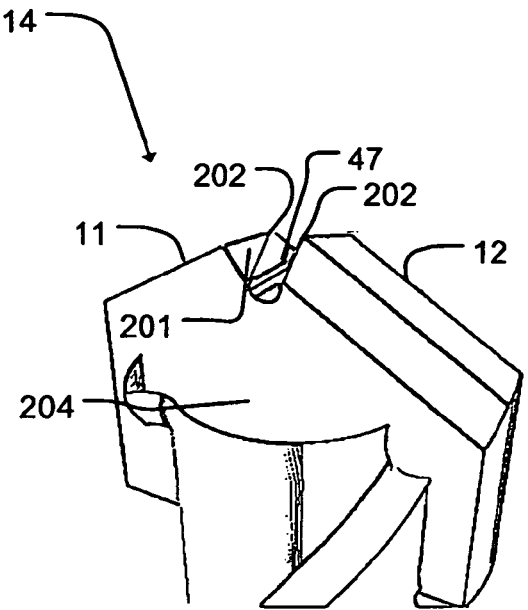
Figure 25C:
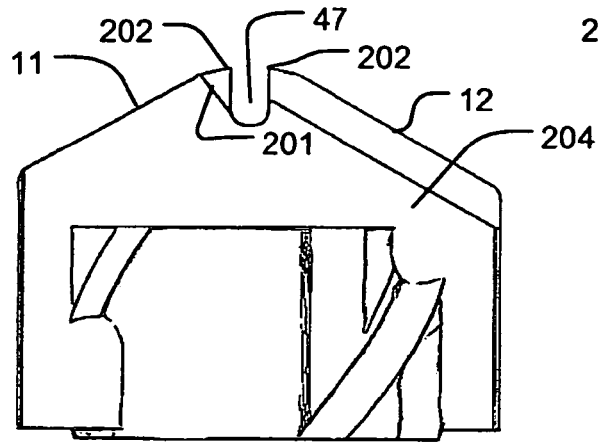
Figure 25D:
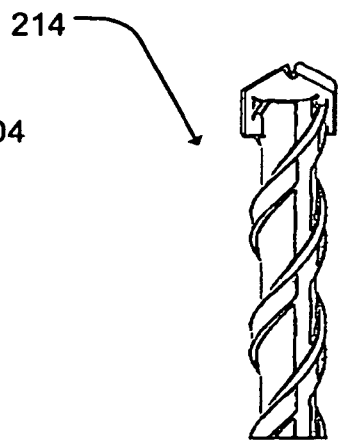

FIG. 26 shows a view along the axis of rotation of an embodiment of the invention. The groove 17 connects the left cutting edge 11 and the right cutting edge 12 at each end of the groove 17. However the cutting edges 11, 12 may also be positioned across from each other or positioned at an angle to the radius and not along the radius. In any event, the cutting edges do not pass through the axis of rotation in this embodiment. The diameter 24 of the head may be wider than the diameter of the body 19. However, the diameter 24 of the head is the diameter 24 of the drill, even though the diameter of the body might be smaller. The direction of the groove has a certain angle to the cutting edges 11 and 12. The angle is in this embodiment less than 90°, such as between 60° and 89°. Each of the cutting edges is provided with a slanted surface 201, which extends between the bottom of the groove and the respective cutting edge. The angle of the slanted surface is preferably between 30° and 45° relative to the left or the right side, respectively.

On most of the figures the groove is shown as being perpendicular to the center line or plane. The groove may also be at an angle, such as +/−45 degrees to the center line or plane dependent on the direction of the rotation or between 90 and +/−45 degrees to the center line or plane.

Any feature from any of the above-mentioned embodiments may be applied to one or more of the other embodiments, such as rounded end points, a flat bottom, angled or inclined sides of the groove. The different embodiments may furthermore be provided with three, four or more cutting edges.

The different embodiments above may be made from tungsten carbide or durium (durable silicon bronze alloy) bonded to a spiraled steel shaft. Other hard materials, such as diamond or diamond ground may also be in the composition.

The different embodiments may comprise a drill having a diameter between 2 mm and 45 mm, 2 mm and 40 mm, 2 mm and 35 mm, 2 mm and 30 mm, 2 mm and 25 mm, 2 mm and 20 mm, 2 mm and 16 mm or between 4 mm and 12 mm.

The words drill is used when referring to the whole drill including the body with the thread(s), and drill bit is used when referring to the tip of the drill. In some cases both words may be suitable, e.g. when referring to centering of the drill/drill bit or the diameter of the drill or drill bit.

When referring to centering of the drill bit, what is meant is that sometimes when starting to drill a hole the drill may slide a bit when the power is switched on. But when the drill bit is easier to center, it means that this sliding is reduced or nonexistent.

With the drill/drill bit according to the invention, it has proven feasible to obtain a number of results, when drilling with a drilling machine performing a rotation of the drill/drill bit only, with no pulsating axial movement thereof When drilling in a brick, it has proven possible to drill a hole of 31 and 29 mm when drilling for a predetermined time period of 20 seconds with a constant pressure of 10 kg, with an 8 mm drill/drill bit with a groove width of 1.2 or 1.5 mm, respectively. This corresponds to an increase in drilling rate of 121 and 107%, respectively, when using a drill/drill bit such as an Irwin® 10501934 drill modified according to the present invention.

When drilling in a brick with a drill/drill bit according to the invention, such as a 16 mm Irwin® 10501867 drill with a groove of 1.2 mm, it was possible to drill a hole of 9.2 mm during a predetermined time period of 40 seconds with a constant pressure of 10 kg. This corresponds to an increase of 16% relative to the drilling depth with a drill having no groove.

When drilling in a brick, it has proven possible to drill a hole of 33.4 and 37.9 mm when drilling for a predetermined time period of 20 seconds with a constant pressure of 10 kg with a 6 mm drill/drill bit with a groove width of 1.0 or 1.2 mm, respectively. This corresponds to an increase in the drilling rate of 61 and 82%, respectively, when using a drill/drill bit, such as a 6 mm Irwin® drill, with a groove as compared to the same drill without a groove.

When drilling in a brick, it has proven possible to drill a hole with an average drill depth of 4.6 mm with a constant pressure of 20 kg with a drill/drill bit of 16 mm provided with a groove of 1.5 mm. This corresponds to an improvement in average drill depth of 21%.

When drilling with a drill/drill bit having a diameter of 6 mm, a groove width of 15% of the diameter, and a depth/width ratio of 100%, it has proven possible to drill a hole having a depth of 15 mm in brick, such as ordinary red brick, with a load of 8 kg, at 400 rpm, in 4 seconds.

When drilling with a drill/drill bit having a diameter of 10 mm, a groove width of 13% of the diameter, and a depth/width ratio of 138%, it has proven possible to drill a hole having a depth of 15 mm in brick, such as ordinary red brick, with a load of 8 kg, at 400 rpm, in 5.2 seconds.

When drilling with a drill/drill bit having a diameter of 4 mm, a groove width of 16% of the diameter, and a depth/width ratio of 108%, it has proven possible to drill a hole having a depth of 15 mm in repair mortar, such as Marlon Reparationsbeton FT, Compressive strength: 45 MPa, quarts aggregate, $d_{max}$=1 mm, with a load of 8 kg, at 400 rpm, in 29.8 seconds.

When drilling with a drill/drill bit having a diameter of 7 mm, a groove width of 15% of the diameter, and a depth/width ratio of 105%, it has proven possible to drill a hole having a depth of 15 mm in repair mortar, such as Marlon Reparationsbeton FT, Compressive strength: 45 MPa, quarts aggregate, $d_{max}$=1 mm, with a load of 8 kg, at 400 rpm, in 10.3 seconds.

When drilling with a drill/drill bit having a diameter of 10 mm, a groove width of 13% of the diameter, and a depth/width ratio of 138%, it has proven possible to drill a hole having a depth of 15 mm in repair mortar, such as Marlon Reparationsbeton FT, Compressive strength: 45 MPa, quarts aggregate, $d_{max}$=1 mm, with a load of 10 kg, at 400 rpm, in 5.4 seconds.

When drilling with a drill/drill bit having a diameter of 5 mm, a groove width of 15% of the diameter, and a depth/width ratio of 107%, it has proven possible to drill a hole having a depth of 15 mm in concrete, such as concrete having a compressive strength: 50 MPa; w/c ratio=0.4, granite aggregate, $d_{max}$=16 mm, with a load of 19 kg, at 200 rpm, in 9.8 seconds.

When drilling with a drill/drill bit having a diameter of 10 mm, a groove width of 13% of the diameter, and a depth/width ratio of 138%, it has proven possible to drill a hole having a depth of 15 mm in concrete, such as concrete having a compressive strength: 50 MPa, w/c ratio=0.4, granite aggregate, $d_{max}$=16 mm, with a load of 20 kg, at 200 rpm, in 15.8 seconds.

When drilling with a drill/drill bit having a diameter of 5 mm, a groove width of 15% of the diameter, and a depth/width ratio of 107%, it has proven possible to drill a hole having a depth of 15 mm in tile, such as ordinary glazed wall tiles, thickness=5 mm, with a load of 9 kg, at 400 rpm, in 4.2 seconds.

When drilling with a drill/drill bit having a diameter of 5 mm, a groove width of 15% of the diameter, and a depth/width ratio of 107%, it has proven possible to drill a hole having a depth of 15 mm in brick, such as ordinary red brick, with a load of 8 kg, at 400 rpm, in 12 seconds.

When drilling with a drill/drill bit having a diameter of 12 mm, a groove width of 11% of the diameter, and a depth/width ratio of 138%, it has proven possible to drill a hole having a depth of 15 mm in repair mortar, such as Marlon Reparationsbeton FT, Compressive strength: 45 MPa, quarts aggregate, $d_{max}$=1 mm, with a load of 15 kg, at 200 rpm, in 14.6 seconds.

When drilling with a drill/drill bit having a diameter of 10 mm, a groove width of 13% of the diameter, and a depth/width ratio of 138%, it has proven possible to drill a hole having a depth of 15 mm in concrete, such as concrete having a compressive strength: 50 MPa, w/c ratio=0.4, granite aggregate, $d_{max}$=16 mm, with a load of 21 kg, at 200 rpm, in 13.2 seconds.

When drilling with a drill/drill bit having a diameter of 5 mm, a groove width of 15% of the diameter, and a depth/width ratio of 107%, it has proven possible to drill a hole having a depth of 15 mm in tile, such as ordinary glazed wall tiles, thickness=5 mm, with a load of 9 kg, at 400 rpm, in 5.6 seconds.

When drilling with a drill/drill bit having a diameter of 10 mm and provided with a groove, it has proven possible to repeatedly drill a hole having a depth of 15 mm in repair mortar, such as Marlon Reparationsbeton FT, Compressive strength: 45 MPa, quarts aggregate, $d_{max}$=1 mm, with a load of 13 kg, at 400 rpm, such that holes Nos 1-10 takes between 4 and 5 seconds, holes Nos 11-20 takes between 5 and 6 seconds, holes Nos 21-30 takes between 6 and 7 seconds, holes Nos 31-40 takes between 6 and 7 seconds, holes Nos 41-50 takes between 7 and 8 seconds, holes Nos 51-60 takes between 7 and 11 seconds, holes Nos 61-70 takes between 11 and 15 seconds, holes Nos 71-80 takes between 14 and 16 seconds, holes Nos 81-90 takes between 15 and 17 seconds, holes Nos 91-100 takes between 16 and 20 seconds, holes Nos 101-110 takes between 18 and 20 seconds, holes Nos 111-120 takes between 20 and 22 seconds, holes Nos 121-127 takes between 23 and 25 seconds.

When drilling with a drill/drill bit having a diameter of 10 mm and provided with a groove, it has proven possible to repeatedly drill a hole having a depth of 15 mm in repair mortar, such as Marlon Reparationsbeton FT, Compressive strength: 45 MPa, quarts aggregate, $d_{max}$=1 mm, with a load of 13 kg, at 400 rpm, such that holes No 1-10 takes between 4 and 6 seconds, holes Nos 11-20 takes between 6 and 8 seconds, holes Nos 21-30 takes between 8 and 10 seconds, holes Nos 31-40 takes between 10 and 12 seconds, holes Nos 41-50 takes between 12 and 15 seconds, holes Nos 51-60 takes between 16 and 20 seconds, holes Nos 61-70 takes between 20 and 22 seconds, holes Nos 71-80 takes between 23 and 28 seconds, holes Nos 81-86 takes between 29 and 35 seconds.

When drilling with a drill/drill bit having a diameter of 10 mm and being provided with a groove, it has proven possible to drill a hole having a depth of 15 mm in repair mortar, such as Marlon Reparationsbeton FT, Compressive strength: 45 MPa, quarts aggregate, $d_{max}$=1 mm, with a load of 8 kg, at 400 rpm, in 20 seconds.

When drilling with a drill/drill bit having a diameter of 8 mm provided with a groove, it has proven possible to drill a hole having a depth of 49 mm in concrete, such as concrete tile, with a load of 5 kg, at 2000 rpm, in 10 seconds.

Even though the invention is operable for a large variety of diameters of the drill/drill bit, it is particularly favorable in drill/drill bits having a diameter of at least 4.0 to at most 14.0 mm, or of at least 4.0 to at most 10.0 mm.

The drills according to the present invention have very high durability. Although the drills come in different diameters, the durability may be expressed with reference to a drill having a diameter of 10 mm where the drill while mounted in a pillar drilling machine set to a fixed drill speed of 400 rpm and a drill loading on the drill of 13 kg and after having drilled 40 holes of a depth of 15 mm in the material repair mortar of the type "Marlon Reparationsbeton FT" (compressive strength of 45 MPa and a quarts aggregate maximum diameter of $d_{max}$=1 mm) is capable of drilling three holes of a depth of 15 mm in the same material on average in less than 15 seconds per hole, preferably in less than 12 seconds per hole and even more preferably in less than 10 seconds per hole. It has furthermore been proven that modification of a hammer drill, i.e. providing the drill with a groove, and drilling with a hammer drilling machine involving substantial pulsating axial movement, no significant difference in drilling depth is observed between the standard hammer drill and the modified hammer drill.

In the following specific examples making use of various embodiments of the invention will be described.

EXAMPLES

Several examples have been carried out where the diameter of the drill and the groove width has been varied. All drilling examples were carried out in a porous material and with a groove where the two sides were parallel to each other. The same drill within each size of drill has been used for all examples, just increasing the width of the groove.

Example 1

An 8 mm Irwin® 10501934 drill was mounted in a pillar drill. The pillar drill was loaded with a constant pressure of 10 kg and rested on a brick. The drilling machine was started and allowed to drill in the brick for the time period indicated in the table.

TABLE 1

| Groove width/mm | Drilling depth/mm | Time/sec |
|---|---|---|
| 0 (no groove) | 14 | 20 |
| 0.7 | 23 | 20 |
| 1.2 | 31 | 20 |
| 1.5 | 29 | 20 |

Example 1 shows a significantly improved drilling rate as the drill depth is more than doubled, when a groove width of 1.2 mm or 1.5 mm is provided in comparison to when no groove is provided. The drilling rate is significantly improved where a groove width of 0.7 mm is provided. The best result achieved for an 8 mm drill bit is where a groove width of 1.2 mm is provided, corresponding to an increase in drilling rate of 121%.

Example 2

A 16 mm Irwin® 10501867 drill was mounted in a pillar drill. The pillar drill was loaded with a constant pressure of 10 kg and rested on a brick. The drilling machine was started and allowed to drill in the brick for the time period indicated in the table.

TABLE 2

| Groove width/mm | Drilling depth/mm | Time/sec |
|---|---|---|
| 0 (no groove) | 7.9 | 40 |
| 1.2 | 9.2 | 40 |

Example 2 shows that the drilling depth has been increased by 1.3 mm, which is an improvement of 16.5% over a drill bit with no groove. Hence, a groove width of 1.2 mm is preferred over no groove.

Example 3

A 6 mm Irwin® drill was mounted in a pillar drill. The pillar drill was loaded with a constant pressure of 10 kg and rested on a brick. The drilling machine was started and allowed to drill in the brick for the time period indicated in the table.

TABLE 3

| Groove width/mm | Drilling depth/mm | Time/sec |
|---|---|---|
| 0 (no groove) | 20.8 | 20 |
| 1.0 | 33.4 | 20 |
| 1.2 | 37.9 | 20 |

Example 3 shows a significant improvement in the drilling rate when providing the drill bit with a groove width of 1.0 or 1.2 mm, in comparison to when no groove is provided.

Example 4

A 16 mm Irwin® 10501867 drill was mounted in a pillar drill. The pillar drill was loaded with a constant pressure of 20 kg and rested on a brick. The drilling machine was started and allowed to drill in the brick for the time period indicated in the table.

TABLE 4

| Groove width/mm | Drilling depth/mm | Time/sec |
|---|---|---|
| 0 (no groove) | 5.6 | 20 |
| 0 (no groove) | 4.6 | 20 |
| 0 (no groove) | 4.0 | 20 |
| 0 (no groove) | 4.1 | 20 |
| 0 (no groove) | 3.8 | 20 |
| 0 (no groove) | 3.8 | 20 |
| 0 (no groove) | 3.3 | 20 |
| 0 (no groove) | 3.5 | 20 |
| 0 (no groove) | 2.8 | 20 |
| 0 (no groove) | 3.0 | 20 |
| 1.5 | 6.0 | 20 |
| 1.5 | 4.9 | 20 |
| 1.5 | 5.1 | 20 |
| 1.5 | 5.4 | 20 |
| 1.5 | 4.7 | 20 |
| 1.5 | 3.5 | 20 |
| 1.5 | 6.4 | 20 |
| 1.5 | 3.9 | 20 |
| 1.5 | 3.6 | 20 |
| 1.5 | 2.9 | 20 |

Even though variations occur when several examples are carried out with the same drill bit the tendency is clear. An improvement in average drill depth from 3.8 mm to 4.6 mm constitutes an improvement of 21%. Hence, a groove width of 1.5 mm is to prefer over no groove, when a higher drilling rate is desired.

Example 5

A 16 mm Irwin® 10501867 drill was mounted in a pillar drill. The pillar drill was loaded with a constant pressure of 20 kg and the drill rested on a brick. The drilling machine was started and allowed to drill in the brick for the time period indicated in the table.

TABLE 5

| Groove width/mm | Drilling depth/mm | Time/sec |
|---|---|---|
| 0 (no groove) | 0.84 | 20 |
| 0 (no groove) | 0.70 | 20 |
| 1.2 | 0.99 | 20 |
| 1.2 | 1.00 | 20 |
| 1.5 | 1.00 | 20 |
| 1.5 | 1.10 | 20 |

Example 5 shows that a groove width of 1.5 mm in a 16 mm drill bit achieves a similar result in drill depth as a groove width of 1.2 mm.

During the experiment the experimenter experienced problems with centering of the drill when the groove was 1.5 mm. The greatest improvement in drilling rate for the 6 and 8 mm drills was where a groove width of 1.2 mm was provided. The preferred groove width is as a result 1.2 mm for the drills of 6, 8, and 16 mm in diameter. The 1.2 mm groove width provides an improved drilling rate over drills without a groove or with grooves within the range of 0.7 and 1.0 mm, and thus the smaller groove makes the drill easier to center. The preferred groove width is when the drilling rate and the centering ability are balanced.

Example 6

Two types of standards drills were modified: IRWIN Cordless, Ø4 to 12 mm and BOSCH Universal, Ø4 to 12 mm The IRWIN and BOSCH drills were modified by cutting a small groove in the drills using a diamond disc saw. The grooves are cut perpendicularly to the head of the drills as illustrated in FIG. 1.

The size of the grooves varies with the size of the drills according to Table 6:

TABLE 6

| Diameter of drill (Ø mm) | Width of groove (mm) | Depth of groove (mm) | % Groove width | % Depth/width |
|---|---|---|---|---|
| 4 | 0.65 | 0.7 | 16 | 108 |
| 5 | 0.75 | 0.8 | 15 | 107 |
| 6 | 0.90 | 0.9 | 15 | 100 |
| 7 | 1.05 | 1.1 | 15 | 105 |
| 8 | 1.20 | 1.2 | 15 | 100 |
| 10 | 1.30 | 1.8 | 13 | 138 |
| 12 | 1.3 | 1.8 | 11 | 138 |

The grooves were cut in the factory made standard drills without using cooling, thus the drills became very hot during the preparation. Furthermore, the groves were cut after the factory hardening of the head of the drills and no subsequent hardening was made. It can be expected that the durability of the modified drills can be improved if the grooves are cut using water cooling and if subsequent hardening of the drills is made.

The efficiency of the drills was tested on four different building materials:
1. Ordinary red brick,
2. Repair mortar (Marlon Reparationsbeton FT, Compressive strength: 45 MPa, quarts aggregate, $d_{max}$=1 mm)
3. Concrete (Compressive strength: 50 MPa, w/c ratio=0.4, Granite aggregate, $d_{max}$=16 mm)
4. Glazed tile (Ordinary glazed wall tiles, thickness=5 mm)

Test Set-Up

Pillar drilling machine: Pillar drill with adjustable drilling speed and readable drilling depth. The use of a pillar drill ensures that tests can be repeated under same conditions, i.e. angle of drill, load on drill, drilling depth and drilling speed.

Speed of drill (r): Varied between 200 and 400 rpm depending on the material.

Load on drill (L): Varied between 8 and 21 kg depending on the material.

Test Program

The efficiency of the drills is tested by measuring and comparing the drilling time of a standard drill and a modified drill with the same diameter. The drilling times in four different building materials: brick, repair mortar, concrete and glazed tile, are tested. The testing procedure is as follows:

For each pair of drills (a standard drill and a modified drill with equal diameter and of same brand):
The standard drill is mounted in the drilling machine.
A weight is mounted on the handle of the drilling machine and the resulting load, L, on the drill is determined.
The speed of the drilling machine is adjusted so that is suitable for the material to be drilled in.
The material to be drilled in (brick, repair mortar, concrete, or tile) is fastened on the plane of the pillar drill.
The time, $t_{st}$, for the drill to reach a depth, d, is measured. $t_{st}$, is measured five times for each drill size and each material.
The procedure is repeated for a modified drill of equal diameter.

The results are shown in Table 7 below for the IRWIN drills.

TABLE 7

| Material | Ø mm | L kg | r rpm | d mm | $t_{st}$ sec. | $t_{mod}$ sec | $\Delta t_{abs}$ sec | $\Delta t_{rel}$% |
|---|---|---|---|---|---|---|---|---|
| Brick | 6 | 8 | 400 | 15 | 6 | 4 | 2 | 33 |
|  | 10 |  |  |  | 12.4 | 5.2 | 7.2 | 58 |
| Repair mortar | 4 | 8 | 400 | 15 | 35 | 29.8 | 5.2 | 15 |
|  | 7 | 8 |  |  | 20.4 | 10.3 | 10 | 49 |
|  | 10 | 10 |  |  | 18.2 | 5.4 | 13 | 69 |
| Concrete | 5 | 19 | 200 | 15 | 13.2 | 9.8 | 3.4 | 26 |
|  | 10 | 20 |  |  | 25.75 | 15.8 | 10 | 39 |
| Tile | 5 | 9 | 400 | 5 | 9.4 | 4.2 | 5 | 55 |

It may be concluded that the drilling time to reach a specified drilling dept is reduced when using the modified drills as compared to the corresponding time for the standard drill. This accounts for all tested materials and all tested diameters of drills. The reduction in drilling time varies between 15 and 69% for the IRWIN drills depending on diameter of drill and testing material.

For a given load exerted on the drill, the reduction in drilling time is more significant the larger the diameter of the drill. It also appears that the drilling speed for the more homogenous porous materials like brick, repair mortar and tile is faster than for more inhomogeneous porous materials like concrete.

The results for the BOSCH drills are shown in Table 8 below:

TABLE 8

| Material | Ø mm | L kg | r rpm | d mm | $t_{st}$ sec. | $t_{mod}$ sec | $\Delta t_{abs}$ sec | $\Delta t_{rel}$% |
|---|---|---|---|---|---|---|---|---|
| Brick | 5 | 8 | 400 | 15 | 30 | 12.2 | 17 | 58 |
| Repair mortar | 12 | 15 | 200 | 15 | 22.6 | 14.6 | 8 | 35 |
| Concrete | 10 | 21 | 200 | 15 | 30 | 13.2 | 17 | 56 |
| Tile | 5 | 9 | 400 | 5 | 24.2 | 5.6 | 19 | 77 |

It may be inferred that drilling speeds are high even for the drills having a lower diameter of Ø5 mm. Thus, compared to the Irwin drills the BOSCH drills have an increased drilling speed in brick and tile for the small drill diameters. It may be concluded that the drilling time to reach a specified drilling dept is reduced when using the modified drills as compared to the corresponding time for the standard drill. This accounts for all tested materials and all tested diameters of drills.

For a given load exerted on the drill, the reduction in drilling time is more significant the larger the diameter of the drill. It also appears that the drilling speed for the more homogenous porous materials like brick, repair mortar and tile is faster than for more inhomogeneous porous materials like concrete. The reduction in drilling time varies between 35 and 77% for the BOSCH drills depending on diameter of drill and testing material.

Example 7

Durability of modified drills as compared to standard drills.

Drills from two drill producers have been examined: drills from IRWIN and drills from BOSCH. Drills from each producer have been modified according to the invention and the durability of the modified drills have been tested and compared with the standard version of the drills.

The durability of standard and modified IRWIN and BOSCH drills is tested and compared:
  Standard drills: IRWIN Cordless, Ø10 mm
  Modified drills: IRWIN Cordless, Ø10 mm
  Standard drills: BOSCH Universal, Ø10 mm
  Modified drills: Modified BOSCH Universal, Ø10 mm The durability of the drills is tested on repair mortar ("Marlon Reparationsbeton FT", Compressive strength: 45 MPa, quarts aggregate, $d_{max}$=1 mm).

Test Set-Up

Pillar drilling machine: Pillar drill with adjustable drilling speed and readable drilling depth. The use of a pillar drill ensures that tests can be repeated under same conditions.
  Speed of drill, r: Fixed speed, 400 rpm.
  Load on drill, L: Fixed load, 13 kg.
  Drilling depth per repetition, d: 15 mm
  Diameter of drills, Ø: 10 mm
  Number of repetitions per drill: n Test Program The durability of the drills is tested by measuring and comparing the drilling times of a standard drill and a modified drill with the same diameter. The testing procedure is as follows:

For each pair of drills (a standard drill and a modified drill with equal diameter and of same brand):
  The standard drill is mounted in the drilling machine.
  A weight is mounted on the handle of the drilling machine and the resulting load, L, on the drill is determined.
  The speed of the drilling machine is adjusted so that is suitable for the material to be drilled in.
  The material to be drilled in (repair mortar) is fastened on the plane of the pillar drill.
  The time, $t_{st,1}$, for the drill to reach the depth, d, is measured (initial drilling time for standard drill).
  This is repeated until the drilling time with the standard drills doubled, i.e. until $t_{st}=2\,t_{st,1}$.
  The modified drill is mounted in the drilling machine (initial drilling time for modified drill).
  The time, $t_{mod,1}$, for the drill to reach a depth, d, is measured.
  This is repeated until the drilling time with the modified drill reaches a drilling time equal to twice the initial drilling time of the standard drill i.e. until $t_{mod}=2\,t_{st,1}$.

The results are shown in Table 9 for the IRWIN drills and in table 10 for the Bosch drills.

TABLE 9

| No. Of repetitions, n | $t_{st}$ sec. | $t_{mod}$ sec. | $T_{st,rel}$ sec. | $t_{mod,rel}$ sec. |
|---|---|---|---|---|
| 1 | 15 | 4 | 1 | 1 |
| 2 | 16 | 5 | 1.1 | 1.3 |
| 3 | 17 | 4 | 1.1 | 1 |
| 4 | 14 | 4 | 0.9 | 1 |
| 5 | 17 | 4 | 1.1 | 1 |
| 6 | 15 | 4 | 1 | 1 |
| 7 | 16 | 5 | 1.1 | 1.3 |
| 8 | 15 | 4 | 1 | 1 |
| 9 | 17 | 5 | 1.1 | 1.3 |
| 10 | 17 | 5 | 1.1 | 1.3 |
| 11 | 17 | 5 | 1.1 | 1.3 |
| 12 | 17 | 5 | 1.1 | 1.3 |
| 13 | 18 | 5 | 1.2 | 1.3 |
| 14 | 17 | 5 | 1.1 | 1.3 |
| 15 | 17 | 5 | 1.1 | 1.3 |
| 16 | 16 | 5 | 1.1 | 1.3 |
| 17 | 22 | 5 | 1.5 | 1.3 |
| 18 | 19 | 6 | 1.3 | 1.5 |
| 19 | 20 | 5 | 1.3 | 1.3 |
| 20 | 18 | 6 | 1.2 | 1.5 |
| 21 | 18 | 6 | 1.2 | 1.5 |
| 22 | 21 | 6 | 1.4 | 1.5 |
| 23 | 24 | 6 | 1.6 | 1.5 |
| 24 | 23 | 7 | 1.5 | 1.8 |
| 25 | 26 | 6 | 1.7 | 1.5 |
| 26 | 21 | 6 | 1.4 | 1.5 |
| 27 | 25 | 6 | 1.7 | 1.5 |
| 28 | 24 | 6 | 1.6 | 1.5 |
| 29 | 29 | 7 | 1.9 | 1.8 |
| 30 | 24 | 6 | 1.6 | 1.5 |
| 31 | 23 | 6 | 1.5 | 1.5 |
| 32 | 22 | 7 | 1.5 | 1.8 |
| 33 | 23 | 6 | 1.5 | 1.5 |
| 34 | 22 | 6 | 1.5 | 1.5 |
| 35 | 28 | 6 | 1.9 | 1.5 |
| 36 | 27 | 7 | 1.8 | 1.8 |
| 37 | 28 | 7 | 1.9 | 1.8 |
| 38 | 26 | 7 | 1.7 | 1.8 |
| 39 | 24 | 6 | 1.6 | 1.5 |
| 40 | 25 | 7 | 1.7 | 1.8 |
| 41 | 25 | 7 | 1.7 | 1.8 |
| 42 | 24 | 7 | 1.6 | 1.8 |
| 43 | 24 | 7 | 1.6 | 1.8 |
| 44 | 24 | 7 | 1.6 | 1.8 |
| 45 | 24 | 8 | 1.6 | 2 |
| 46 | 31 | 8 | 2.1 | 2 |
| 47 | 30 | 7 | 2 | 1.8 |
| 48 | 31 | 7 | 2.1 | 1.8 |
| 49 | 24 | 7 | 1.6 | 1.8 |
| 50 | 26 | 7 | 1.7 | 1.8 |
| 51 |  | 8 |  | 2 |
| 52 |  | 7 |  | 1.8 |
| 53 |  | 7 |  | 1.8 |
| 54 |  | 8 |  | 2 |
| 55 |  | 8 |  | 2 |
| 56 |  | 11 |  | 2.8 |
| 57 |  | 9 |  | 2.3 |
| 58 |  | 9 |  | 2.3 |
| 59 |  | 10 |  | 2.5 |
| 60 |  | 10 |  | 2.5 |
| 61 |  | 13 |  | 3.3 |
| 62 |  | 11 |  | 2.8 |
| 63 |  | 12 |  | 3 |
| 64 |  | 12 |  | 3 |
| 65 |  | 12 |  | 3 |
| 66 |  | 15 |  | 3.8 |
| 67 |  | 14 |  | 3.5 |
| 68 |  | 14 |  | 3.5 |
| 69 |  | 15 |  | 3.8 |
| 70 |  | 15 |  | 3.8 |
| 71 |  | 14 |  | 3.5 |
| 72 |  | 16 |  | 4 |
| 73 |  | 14 |  | 3.5 |
| 74 |  | 15 |  | 3.8 |
| 75 |  | 15 |  | 3.8 |
| 76 |  | 16 |  | 4 |
| 77 |  | 16 |  | 4 |
| 78 |  | 16 |  | 4 |
| 79 |  | 16 |  | 4 |
| 80 |  | 15 |  | 3.8 |

TABLE 9-continued

| No. Of repetitions, n | $t_{st}$ sec. | $t_{mod}$ sec. | $T_{st, rel}$ sec. | $t_{mod, rel}$ sec. |
|---|---|---|---|---|
| 81 | | 15 | | 3.8 |
| 82 | | 16 | | 4 |
| 83 | | 16 | | 4 |
| 84 | | 16 | | 4 |
| 85 | | 17 | | 4.3 |
| 86 | | 17 | | 4.3 |
| 87 | | 17 | | 4.3 |
| 88 | | 16 | | 4 |
| 89 | | 16 | | 4 |
| 90 | | 16 | | 4 |
| 91 | | 16 | | 4 |
| 92 | | 16 | | 4 |
| 93 | | 16 | | 4 |
| 94 | | 17 | | 4.3 |
| 95 | | 17 | | 4.3 |
| 96 | | 18 | | 4.5 |
| 97 | | 18 | | 4.5 |
| 98 | | 20 | | 5 |
| 99 | | 19 | | 4.8 |
| 100 | | 18 | | 4.5 |
| 101 | | 18 | | 4.5 |
| 102 | | 19 | | 4.8 |
| 103 | | 19 | | 4.8 |
| 104 | | 19 | | 4.8 |
| 105 | | 19 | | 4.8 |
| 106 | | 19 | | 4.8 |
| 107 | | 18 | | 4.5 |
| 108 | | 19 | | 4.8 |
| 109 | | 20 | | 5 |
| 110 | | 20 | | 5 |
| 111 | | 20 | | 5 |
| 112 | | 21 | | 5.3 |
| 113 | | 20 | | 5 |
| 114 | | 21 | | 5.3 |
| 115 | | 20 | | 5 |
| 116 | | 21 | | 5.3 |
| 117 | | 22 | | 5.5 |
| 118 | | 21 | | 5.3 |
| 119 | | 20 | | 5 |
| 120 | | 22 | | 5.5 |
| 121 | | 23 | | 5.8 |
| 122 | | 23 | | 5.8 |
| 123 | | 23 | | 5.8 |
| 124 | | 24 | | 6 |
| 125 | | 25 | | 6.3 |
| 126 | | 25 | | 6.3 |
| 127 | | 25 | | 6.3 |
| Total drilling depth, mm | 750 | 1905 | | |

Notation
$t_{st}$ Time for the standard drill to reach a depth of d (seconds)
$t_{mod}$ Time for the modified drill to reach a depth of d (seconds)
d Drilling depth (mm)
r Speed of drilling machine (rpm)
L Load exerted on the drill by the test setup (kg)
Ø Diameter of drill
$t_{st, rel} = t_{st, n}/t_{st, 1}$ Relative drilling time, standard drill
$t_{mod, rel} = t_{mod, n}/t_{mod, 1}$ Relative drilling time, modified drill.

It may be concluded that:

The initial drilling time for the standard drill is $t_{st,1}$=15 sec. After 50 repetitions the drilling time has been approximately doubled to 25-30 sec. The total drilling depth reached before the drilling time is doubled for the standard drill is thus 750 mm. After 50 repetitions, the drilling time for the modified drills is also doubled; however the drilling times are much shorter. The drilling time of the modified drill is increased from 4 to 8 sec., a difference of 4 sec. only.

The total drilling time for 50 repetitions are approximately 1100 sec for the standard drill and approximately 300 sec for the modified drill.

I.e. the drilling time to reach 50 repetitions with the modified drill is reduced to approximately 30% of that of the standard drill.

For the modified drill to reach a drilling time corresponding to the initial drilling time for the standard drill (i.e. 25 to 30 sec.), a total of 127 repetitions are needed, i.e. a total drilling depth of 1900 mm, or 2.5 times the total drilling depth of the standard drill.

The results for the BOSCH drills are shown in Table 10 below:

TABLE 10

| No. Of repetitions, n | $t_{st}$ sec. | $t_{mod}$ sec. | $T_{st, rel}$ sec. | $t_{mod, rel}$ sec. |
|---|---|---|---|---|
| 1 | 16 | 4 | 1 | 1 |
| 2 | 18 | 4 | 1.1 | 1 |
| 3 | 18 | 4 | 1.1 | 1 |
| 4 | 17 | 5 | 1.1 | 1.3 |
| 5 | 20 | 5 | 1.3 | 1.3 |
| 6 | 20 | 5 | 1.3 | 1.3 |
| 7 | 19 | 5 | 1.2 | 1.3 |
| 8 | 18 | 5 | 1.1 | 1.3 |
| 9 | 19 | 6 | 1.2 | 1.5 |
| 10 | 20 | 6 | 1.3 | 1.5 |
| 11 | 22 | 6 | 1.4 | 1.5 |
| 12 | 25 | 6 | 1.6 | 1.5 |
| 13 | 23 | 7 | 1.4 | 1.8 |
| 14 | 25 | 7 | 1.6 | 1.8 |
| 15 | 23 | 7 | 1.4 | 1.8 |
| 16 | 24 | 7 | 1.5 | 1.8 |
| 17 | 28 | 7 | 1.8 | 1.8 |
| 18 | 27 | 8 | 1.7 | 2 |
| 19 | 34 | 8 | 2.1 | 2 |
| 20 | 36 | 7 | 2.3 | 1.8 |
| 21 | 31 | 8 | 1.9 | 2 |
| 22 | 31 | 9 | 1.9 | 2.3 |
| 23 | 31 | 9 | 1.9 | 2.3 |
| 24 | 32 | 8 | 2 | 2 |
| 25 | 34 | 8 | 2.1 | 2 |
| 26 | | 9 | | 2.3 |
| 27 | | 10 | | 2.5 |
| 28 | | 10 | | 2.5 |
| 29 | | 10 | | 2.5 |
| 30 | | 10 | | 2.5 |
| 31 | | 10 | | 2.5 |
| 32 | | 10 | | 2.5 |
| 33 | | 10 | | 2.5 |
| 34 | | 11 | | 2.8 |
| 35 | | 11 | | 2.8 |
| 36 | | 11 | | 2.8 |
| 37 | | 11 | | 2.8 |
| 38 | | 11 | | 2.8 |
| 39 | | 11 | | 2.8 |
| 40 | | 12 | | 3 |
| 41 | | 12 | | 3 |
| 42 | | 13 | | 3.3 |
| 43 | | 12 | | 3 |
| 44 | | 12 | | 3 |
| 45 | | 12 | | 3 |
| 46 | | 12 | | 3 |
| 47 | | 13 | | 3.3 |
| 48 | | 13 | | 3.3 |
| 49 | | 14 | | 3.5 |
| 50 | | 15 | | 3.8 |
| 51 | | 16 | | 4 |
| 52 | | 16 | | 4 |
| 53 | | 16 | | 4 |
| 54 | | 16 | | 4 |
| 55 | | 17 | | 4.3 |
| 56 | | 17 | | 4.3 |
| 57 | | 18 | | 4.5 |
| 58 | | 19 | | 4.8 |
| 59 | | 19 | | 4.8 |
| 60 | | 20 | | 5 |
| 61 | | 20 | | 5 |
| 62 | | 21 | | 5.3 |
| 63 | | 21 | | 5.3 |
| 64 | | 21 | | 5.3 |
| 65 | | 22 | | 5.5 |
| 66 | | 21 | | 5.3 |
| 67 | | 21 | | 5.3 |

TABLE 10-continued

| No. Of repetitions, n | $t_{st}$ sec. | $t_{mod}$ sec. | $T_{st, rel}$ sec. | $t_{mod, rel}$ sec. |
|---|---|---|---|---|
| 68 | | 21 | | 5.3 |
| 69 | | 22 | | 5.5 |
| 70 | | 22 | | 5.5 |
| 71 | | 23 | | 5.8 |
| 72 | | 24 | | 6 |
| 73 | | 25 | | 6.3 |
| 74 | | 24 | | 6 |
| 75 | | 24 | | 6 |
| 76 | | 24 | | 6 |
| 77 | | 24 | | 6 |
| 78 | | 25 | | 6.3 |
| 79 | | 28 | | 7 |
| 80 | | 29 | | 7.3 |
| 81 | | 30 | | 7.5 |
| 82 | | 29 | | 7.3 |
| 83 | | 30 | | 7.5 |
| 84 | | 32 | | 8 |
| 85 | | 32 | | 8 |
| 86 | | 35 | | 8.8 |
| Total drilling depth, mm | 375 | 1290 | | |

It may be concluded that for the Bosch drill the initial drilling time for the standard drill is $t_{st,1}$=16 sec. After 25 repetitions the drilling time has been approximately doubled to 32-34 sec. The total drilling depth reached before the drilling time is doubled for the standard drill is thus 375 mm.

After 25 repetitions, the drilling time for the modified drills is also doubled, however the drilling times are much shorter. The drilling time of the modified drill is increased from 4 to 8 sec., a difference of 4 sec. only.

The total drilling time for 25 repetitions are approximately 600 sec for the standard drill and approximately 160 sec for the modified drill.

I.e. the drilling time to reach 25 repetitions with the modified drill is reduced to approximately 25% of that of the standard drill.

For the modified drill to reach a drilling time corresponding to the initial drilling time for the standard drill (i.e. 32-34 sec.), a total of 86 repetitions are needed, i.e. a total drilling depth of 1300 mm, or 3.5 times the total drilling depth of the standard drill.

It can generally be concluded that the modified drills are more durable and that the modified drills can be used for more repetitions (larger total drilling depth) than the standard drills before acceptable drilling times are exceeded.

Furthermore the drilling time will be reduced using modified drills. For the same total drilling depth the drilling time is significantly reduced, and additionally the modified drills can be used for a longer period and thus time and costs of replacement of drills are reduced.

Example 8

To types of hammer drills have been examined: a standard version and a modified version of the IRWIN Joran, Ø8 mm and 12 mm. The modified version was modified according to the invention and the efficiency of the modified drills have been tested and compared with the standard version of the drills.

Hammer drills from IRWIN have been modified and the efficiency of the modified drills have been tested and compared with the standard version of the drills.

The efficiency of standard and modified IRWIN hammer drills is tested and compared:
Standard hammer drills: IRWIN Joran, Ø8 and 12 mm
Modified hammer drills: Modified IRWIN Joran, Ø8 and 12 mm The efficiency of the drills is tested on concrete, compressive strength: 50 MPa, w/c ratio=0.4, Granite aggregate, $d_{max}$=16 mm)

Test Set-Up

Hammer drilling machine: Hilti TE 6-S (weight 3.5 kg). The drilling machine is held by hand and no extra load except from the weight of the drilling machine itself is exerted on the drill.

Speed of drill, r: Full speed of the hammer drill.
Load on drill, L: Weight of drilling machine, 3.5 kg.

Test Program

The efficiency of the hammer drills is tested by measuring and comparing the drilling depth reached in 15 seconds with a standard hammer drill and a modified hammer drill with the same diameter. The testing procedure is as follows:

For each pair of drills (a standard hammer drill and a modified hammer drill with equal diameter):

Standard hammer drill:
The standard hammer drill is mounted in the drilling machine.
The drill is held perpendicular to the concrete surface.
The drilling machine is set to maximum speed and at the same time a stop watch is started.
No pressure but the pressure generated by the weight of the drilling machine is exerted on the drilling machine.
After a drilling time of 15 seconds, the drill is stopped and the drilling depths $d_{15,st}$ are measured.
$d_{st}$ is measured three times for each drill size.

Modified Hammer Drill:
The same procedure as carried out with the standard hammer drill is repeated with the modified hammer drill.

The results are shown in Table 11:

TABLE 11

| Material | Ø mm | L kg | r rpm | t sec | $d_{st}$ mm | $d_{mod}$ mm | $\Delta d_{abs}$ | $\Delta d_{rel}$ |
|---|---|---|---|---|---|---|---|---|
| Concrete | 8 | 3.4 | Full speed | 15 | 75 | 76 | 0 | 0 |
| | 8 | | | | 70 | 70 | | |
| | 8 | | | | 67 | 67 | | |
| | 12 | 3.4 | Full speed | 15 | 57 | 50 | −7 | −13 |
| | 12 | | | | 53 | 45 | | |
| | 12 | | | | 52 | 46 | | |

Notation
$d_{st}$ Drilling depth for the standard drill to be reached in t = 15 seconds (mm)
$d_{mod}$ Drilling depth for the modified drill to be reached in t = 15 seconds (mm)
t Drilling time (seconds)
r Speed of drilling machine
L Load exerted on the drill by the test setup equal to the weight of the drilling machine (kg)
Ø Diameter of drill (mm)
$\Delta d_{abs}$ Absolute increase in drilling depth for modified drill compared to standard drill (mm)
$\Delta d_{rel}$ Relative reduction in drilling depth for modified drill compared to standard drill (%).

It may be concluded that:
No significant difference in drilling depth could be observed between the standard hammer drill and the modified hammer drill.

Example 9

Drills from drill producer, IRWIN, have been examined. Drills from the producer have been modified and the efficiency of the modified drills have been tested and compared with the standard version of the drills.

The tests are carried out to illustrate the necessary load needed on the standard and the modified version of the drills, respectively.

The efficiency of standard and modified IRWIN drills is tested and compared:
Standard drills: IRWIN Cordless, Ø10 mm
Modified drills: IRWIN Cordless, Ø10 mm The efficiency of the drills is tested on repair mortar ("Marlon Reparationsbeton FT", Compressive strength: 45 MPa, quarts aggregate, $d_{max}$=1 mm)

Test Set-Up
Pillar drilling machine: Pillar drill with adjustable drilling speed and readable drilling depth. The use of a pillar drill ensures that tests can be repeated under same conditions.
Speed of drill, r: Fixed speed, 400 rpm.
Load on drill, L: Load varied from 8 kg (on the standard drill) to 11 kg (on the modified drill).
Drilling depth per repetition, d: 15 mm
Diameter of drills, Ø: 10 mm Test Program
The load on the standard and the modified the drills are adjusted so that approximately the same drilling times are obtained. The testing procedure is as follows:

For each pair of drills (a standard drill and a modified drill with equal diameter and of same brand):

Standard Drill:
The standard drill is mounted in the drilling machine.
A weight is mounted on the handle of the drilling machine and the resulting load, L1, on the drill is determined.
The speed of the drilling machine is adjusted so that is suitable for the material to be drilled in.
The material to be drilled in (repair mortar) is fastened on the plane of the pillar drill.
The time, $t_{st}$, for the drill to reach the depth, d, is measured (drilling time for standard drill with load L1).
This is repeated three times.

Modified Drill:
The modified drill is mounted in the drilling machine.
The load, L2, is adjusted so that approximately the same drilling time as measured for the standard drill is obtained (i.e. $t_{st} \approx t_{mod}$),
The time, $t_{mod}$, for the drill to reach the depth, d, is measured (drilling time for modified drill with load L2).
This is repeated three times.

The results are shown in Table 12 below:

TABLE 12

| Material | Ø mm | L kg | r rpm | d mm | $T_{st}$ sec | $t_{mod}$ sec |
|---|---|---|---|---|---|---|
| Repair mortar | 10 | 8 | 400 | 15 | — | 20 |
| | 10 | | | | — | 22 |
| | 10 | | | | — | 24 |
| | 10 | 11 | 400 | 15 | 20 | — |
| | 10 | | | | 20 | — |
| | 10 | | | | 22 | — |

Notation
$t_{st}$ Time for the standard drill to reach a depth of d (seconds)
$t_{mod}$ Time for the modified drill to reach a depth of d (seconds)
d Drilling depth (mm)
r Speed of drilling machine (rpm)
L Load exerted on the drill by the test setup (kg)
Ø Diameter of drill The table shows that for a drilling time of approximately 22 sec., a load of 11 kg is needed on the standard drill.

To reach the same drilling time with the modified drill, only 8 kg is needed. Thus, in the given example, the necessary load to be exerted on the modified drill is reduced with almost 30% as compared to the standard drill.

It may be concluded that:
The drilling pressure can be reduced using modified drills. For the same total drilling depth and same drilling time, the load to be exerted on the modified drill is significantly reduced. Thus it is expected that the ergonomic strain for the user of the drill is reduced when using modified drills.

Example 10

A hammer drill from the producer Wallkö has been examined and compared with a modified (non-hammer) version of a drill from the producer IRWIN.

The tests are carried out to illustrate the difference in the drilling depth between a hammer drill and a modified version of a drill, respectively, when drilling for the same period of time. The efficiency of the drills is tested and compared:
Standard hammer drill: Wallkö, Ø8 mm (Wu-515008.0—Tun. Nr. 3902789).
Modified drill: IRWIN, Ø8 mm (10 500 19 32)

The efficiency of the drills is tested on concrete tile

Test Set-Up
Dewalt drilling machine DC 925 18 V, Ø13.
Speed of drill, r: 0-450 rpm; 0-1500 rpm; 0-2000 rpm Test Program
The load on the standard hammer drill and the modified drill are adjusted so that the same drilling times are obtained. The testing procedure is as follows:

For the pair of drills (a standard hammer drill and a modified drill with equal diameter):

Standard Hammer Drill:
The standard drill is mounted in the drilling machine.
A weight is mounted on the handle of the drilling machine and the resulting load on the drill is determined (5 kg).
The hammer function of the drilling machine is activated
The speed of the drilling machine is adjusted so that is suitable for the material to be drilled in.
The material to be drilled in (concrete tile) is fastened on the plane of the pillar drill.
The depth, d, reached in the specified time is measured.
This is repeated two times.

Modified Drill:
The modified (non hammer) drill is mounted in the drilling machine.
The load is adjusted so that approximately the same drilling time as measured for the standard drill is obtained,
The depth, d, reached in the specified time is measured.
This is repeated two times.

The results are shown in Table 13 below:

TABLE 13

| Material | Ø mm | L kg | r rpm | Hammer function | t sec | d mm |
|---|---|---|---|---|---|---|
| Concrete tile | 8 | 5 | 2000 | Yes | 10 | 27 |
| | 8 | | | | 10 | 18 |
| | 8 | 5 | 2000 | No | 10 | 49 |
| | 8 | | | | 10 | 40.8 |

Notation
t drilling time (sec)
d Drilling depth (mm)
r Speed of drilling machine (rpm)
L Load exerted on the drill by the test setup (kg)
Ø Diameter of drill The table shows that for a drilling time of approximately 10 sec, a drilling depth of 27 and 18 mm, respectively, was attained with the hammer drill.

At the same drilling time with the modified drill, the corresponding drilling depth is 49 and 40.8 mm, respectively. Thus, in the given example, the efficiency of the modified drill when drilling during the same time period is increased by 80% and 127%, respectively, as compared to the hammer drill.

It may be concluded that:

The drilling depth and drilling rate can be increased using modified drills as compared to hammer drills.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A rotary masonry drill, comprising:
   at least one groove, having a center lying on an axis of rotation of the rotary masonry drill, each said at least one groove extending between two end points defining a groove width, with a distance between the two end points being smaller than a depth of the at least one groove; and
   at least two cutting edges, each cutting edge defining a respective cutting angle,
   the at least one groove including a left side and a right side, with the groove width being between 0.6 mm and 18 mm and the rotary masonry drill having a diameter of between 2 mm and 45 mm, and each of the respective cutting angles being between 30 and −30 degrees in relation to the axis of rotation.

2. The rotary masonry drill according to claim 1, wherein the groove width is in a range of from 1.1 to 1.4 mm.

3. The rotary masonry drill according to claim 1, wherein the rotary masonry drill has a set of at least three grooves, including a first, a second, and a third groove, of which the first groove is the groove having the center lying on the axis of rotation of the drill.

4. The rotary masonry drill according to claim 3, wherein the number of grooves is 5, 7, or 9.

5. The rotary masonry drill according to claim 3, wherein the second and subsequent grooves are provided along the cutting edge between the first groove and a circumference of the drill.

6. The rotary masonry drill according to claim 5, wherein the second and the subsequent grooves are substantially straight.

7. The rotary masonry drill according to claim 5, wherein the second and the subsequent grooves are curved, each of the second and subsequent grooves having a predetermined radius of curvature.

8. The rotary masonry drill according to claim 7, wherein the predetermined radius of curvature of each of the second and subsequent grooves corresponds to a radius of a circle.

9. The rotary masonry drill according to claim 3, wherein a total area covered by the grooves lies between 10 and 60%.

10. The rotary masonry drill according to claim 3, wherein each of the second and subsequent grooves has a flared shape such that the groove width at the cutting edge is smaller than the groove width at an opposite edge.

11. The rotary masonry drill according to claim 9, wherein the total area covered by the grooves lies between 20 and 50%.

12. The rotary masonry drill according to claim 1, wherein the drill is adapted for drilling in materials selected from the group consisting of tiles, bricks, masonry, concrete, granite, repair mortar, and ceramic materials.

13. The rotary masonry drill according to claim 1, wherein the left side and the right side are parallel to each other or form an angle of less than 30 degrees relative to each other.

14. The rotary masonry drill according to claim 1, wherein the drill includes three or four of the cutting edges.

15. The rotary masonry drill according to claim 1, wherein the groove is deeper than the groove is wide.

16. The rotary masonry drill according to claim 1, wherein a groove depth is between 100-300% of the groove width.

17. The rotary masonry drill according to claim 1, wherein each cutting angle is between 0 and −30 degrees in relation to the axis of rotation.

18. The rotary masonry drill according to claim 1, wherein each cutting angle is between 18 and 0 degrees in relation to the axis of rotation.

19. The rotary masonry drill according to claim 1, wherein each cutting angle is between 30 and 0 degrees in relation to the axis of rotation.

20. The rotary masonry drill according to claim 1, further comprising two end points positioned along a line of the left side and the right side of the groove, respectively, and at a distance from the cutting edge.

21. The rotary masonry drill according to claim 1, wherein each of the cutting edges includes a slanted surface extending between the groove and the respective cutting edge.

22. The rotary masonry drill according to claim 21, wherein an angle of the slanted surface is between 20 and 55 degrees in relation to the left side or the right side, respectively, of the groove.

23. The rotary masonry drill according to claim 22, wherein the angle of the slanted surface is between 30 and 45 degrees in relation to the left side or the right side, respectively, of the groove.

24. The rotary masonry drill, according to claim 21, wherein the slanted surface is triangular.

25. The rotary masonry drill according to claim 21, wherein a width of the slanted surface constitutes no more than ⅓ of a length of the cutting edge.

26. The rotary masonry drill according to claim 25, wherein the width of the slanted surface constitutes no more than ¼ of the length of the cutting edge.

27. The rotary masonry drill according to claim 26, wherein the width of the slanted surface constitutes no more than ⅕ of the length of the cutting edge.

28. The rotary masonry drill according to claim 1, wherein the two end points are positioned substantially on a center line or in a distance from the center line of up to 15% of the diameter of the drill.

29. The rotary masonry drill according to claim 1, wherein the rotary masonry drill is configured for mounting in a drilling machine, which performs rotary movements without significant pulsating axial movements.

30. The rotary masonry drill according to claim 29, wherein the rotary masonry drill includes a drill bit.

31. The rotary masonry drill according to claim 1, wherein the rotary masonry drill is configured for drilling in a porous material.

32. A rotary masonry drill comprising:
   a drill bit including at least one groove having a center lying on an axis of rotation of the rotary masonry drill, each said at least one groove extending between two end points defining a groove width, with a distance between the two end points being smaller than a depth of the at least one groove, the drill bit including at least two cutting edges, each cutting edge defining a respective cutting angle, the at least one groove comprising a left side and a right side, with the groove width being between 0.6 mm and 1.8 mm and the rotary masonry drill bit having a diameter of between 2 mm and 45 mm, and each of the respective cutting angles being between 30 and −30 degrees in relation to the axis of rotation.

33. The rotary masonry drill bit according to claim 32, wherein the groove width is in a range of from 1.1 to 1.4 mm.

34. The rotary masonry drill bit according to claim 32, wherein the drill bit has a set of at least three grooves, including a first, a second, and a third groove, of which the first groove is the groove having the center lying on the axis of rotation of the drill.

35. The rotary masonry drill bit according to claim 34, wherein the number of grooves is 5, 7, or 9.

36. The rotary masonry drill bit according to claim 34, wherein the second and subsequent grooves are provided along the cutting edge between the first groove and a circumference of the drill bit.

37. The rotary masonry drill bit according to claim 36, wherein the second and the subsequent grooves are substantially straight.

38. The rotary masonry drill bit according to claim 36, wherein the second and the subsequent grooves are curved, each of the second and subsequent grooves having a predetermined radius of curvature.

39. The rotary masonry drill bit according to claim 38, wherein the predetermined radius of curvature of each of the second and subsequent grooves corresponds to a radius of a circle.

40. The rotary masonry drill bit according to claim 34, wherein a total area covered by the grooves lies between 10 and 60%.

41. The rotary masonry drill bit according to claim 40, wherein the total, area covered by the grooves lies between 20 and 50%.

42. The rotary masonry drill bit according to claim 34, wherein each of the second and subsequent grooves has a flared shape such that the groove width at the cutting edge is smaller than the groove width at an opposite edge.

43. The rotary masonry drill bit according to claim 32, wherein the drill bit is adapted for drilling in materials selected from the group consisting of tiles, bricks, masonry, concrete, granite, repair mortar, and ceramic materials.

44. The rotary masonry drill bit according to claim 32, wherein the left side and the right side are parallel to each other or form an angle of less than 30 degrees relative to each other.

45. The rotary masonry drill bit according to claim 32, wherein the drill bit includes three or four of the cutting edges.

46. The rotary masonry drill hit according to claim 32, wherein the groove is deeper than the groove is wide.

47. The rotary masonry drill bit according to claim 32, wherein a groove depth is between 100-300% of the groove width.

48. The rotary masonry drill according to claim 32, wherein the drill, bit includes two end points positioned along a line of the left side and the right side of the groove, respectively, and at a distance from the cutting edge.

49. The rotary masonry drill bit according to claim 32, wherein each of the cutting edges of the drill bit includes a slanted surface extending between the groove and the respective cutting edge.

50. The rotary masonry drill according to claim 49, wherein an angle of the slanted surface is between 20 and 55 degrees in relation to the left side or the right side, respectively, of the groove.

51. The rotary masonry drill bit according to claim 50, wherein the angle of the slanted surface is between 30 and 45 degrees in relation to the left side or the right side, respectively, of the groove.

52. The rotary masonry drill bit according to claim 49, wherein the slanted surface is triangular.

53. The rotary masonry drill according to claim 49, wherein a width of the slanted surface constitutes no more than ⅓ of a length of the cutting edge.

54. The rotary masonry drill according to claim 53, wherein the width of the slanted surface constitutes no more than ¼ of the length of the cutting edge.

55. The rotary masonry drill according to claim 54, wherein the width of the slanted surface constitutes no more than ⅕ of the length of the cutting edge.

56. The rotary masonry drill according to claim 32, wherein, the two end points of the drill bit are positioned substantially on a center line or in a distance from the center line of up to 15% of the diameter of the drill.

57. The rotary masonry drill bit according to claim 32, wherein the rotary masonry drill bit is configured for mounting in a drilling machine, which performs rotary movements without significant pulsating axial movements.

58. The rotary masonry drill according to claim 31, wherein the porous material is selected from the group consisting of tiles, bricks, masonry, concrete, granite, repair mortar, artificial granite, breeze block, capping stone, concrete, hardened roof tiles, marble, and ceramic materials.

* * * * *